US012792179B2

(12) United States Patent
Wang et al.

(10) Patent No.: US 12,792,179 B2
(45) Date of Patent: Nov. 10, 2026

(54) DISPLAY APPARATUS AND METHOD OF DRIVING DISPLAY APPARATUS

(71) Applicants: Chengdu BOE Optoelectronics Technology Co., Ltd., Chengdu (CN); BOE Technology Group Co., Ltd., Beijing (CN)

(72) Inventors: Zhiqiang Wang, Beijing (CN); Guiyu Zhang, Beijing (CN); Ping Luo, Beijing (CN)

(73) Assignees: Chengdu BOE Optoelectronics Technology Co., Ltd., Chengdu (CN); Beijing BOE Technology Development Co., Ltd., Beijing (CN)

( * ) Notice: Subject to any disclaimer, the term of this patent is extended or adjusted under 35 U.S.C. 154(b) by 167 days.

(21) Appl. No.: 18/690,060

(22) PCT Filed: May 30, 2023

(86) PCT No.: PCT/CN2023/097060
§ 371 (c)(1),
(2) Date: Mar. 7, 2024

(87) PCT Pub. No.: WO2024/243793
PCT Pub. Date: Dec. 5, 2024

(65) Prior Publication Data
US 2025/0224832 A1 Jul. 10, 2025

(51) Int. Cl.
*G06F 3/041* (2006.01)
*G06F 3/044* (2006.01)

(52) U.S. Cl.
CPC ...... *G06F 3/04166* (2019.05); *G06F 3/04162* (2019.05); *G06F 3/04184* (2019.05); *G06F 3/0446* (2019.05); *G06F 2203/04107* (2013.01)

(58) Field of Classification Search
CPC ............. G06F 3/04166; G06F 3/04162; G06F 3/04184; G06F 3/0446; G06F 2203/04107; G06F 3/03545; G06F 3/04164
See application file for complete search history.

(56) References Cited

U.S. PATENT DOCUMENTS

2012/0256852 A1* 10/2012 Van Antwerpen .... G06F 3/0416 345/173
2012/0331546 A1* 12/2012 Falkenburg ........... G06T 11/001 726/16
(Continued)

FOREIGN PATENT DOCUMENTS

CN 103236240 A 8/2013
CN 108257551 A 7/2018
(Continued)

OTHER PUBLICATIONS

Ito, D., Satou, K., Kitamura, K., Noto, T., Lee, A.Y., Shah, V.S. and Chen, J.Y. (2020), p. 201: Late-News-Poster: Synchronization Technique of Multi-Chip Cascade Architecture for Automotive TDDI. SID Symposium Digest of Technical Papers, 51: 1462-1465. https://doi.org/10.1002/sdtp. 14163 (Year: 2020).*
(Continued)

*Primary Examiner* — Bryan Earles
(74) *Attorney, Agent, or Firm* — Intellectual Vallev Law, P.C.

(57) ABSTRACT

A touch control display apparatus is provided. The touch control display apparatus includes a touch control display panel; and a display and touch control driver connected to the touch control display panel. The display and touch control driver includes one or more touch integrated circuits, an oscillator, and a timing controller chip. The timing controller chip is configured to provide a horizontal synchronization signal and a vertical synchronization signal to
(Continued)

the one or more touch integrated circuits. The oscillator is configured to provide a same clock signal to the one or more touch integrated circuits and the timing controller chip.

14 Claims, 30 Drawing Sheets

(56) References Cited

U.S. PATENT DOCUMENTS

| | | | | |
|---|---|---|---|---|
| 2013/0176251 | A1* | 7/2013 | Wyatt | G06F 3/04166 345/173 |
| 2018/0024650 | A1* | 1/2018 | Hou | G06F 3/0383 345/179 |
| 2018/0059832 | A1* | 3/2018 | Cho | G09G 3/3685 |
| 2019/0317630 | A1* | 10/2019 | Shaw | G06F 3/04166 |
| 2019/0339808 | A1* | 11/2019 | Park | G06F 3/0416 |
| 2022/0187941 | A1* | 6/2022 | Park | G06F 3/0383 |

FOREIGN PATENT DOCUMENTS

| | | | |
|---|---|---|---|
| CN | 111427463 | A | 7/2020 |
| CN | 112860124 | A | 5/2021 |
| CN | 113031805 | A | 6/2021 |
| CN | 113342197 | A | 9/2021 |

OTHER PUBLICATIONS

International Search Report & Written Opinion mailed Feb. 18, 2024, regarding PCT/CN2023/097060.

* cited by examiner

DISPLAY APPARATUS AND METHOD OF DRIVING DISPLAY APPARATUS

CROSS-REFERENCE TO RELATED APPLICATION

This application is a national stage application under 35 U.S.C. § 371 of International Application No. PCT/CN2023/097060, filed May 30, 2023, the contents of which are incorporated by reference in the entirety.

TECHNICAL FIELD

The present invention relates to display technology, more particularly, to a display apparatus and a method of driving a display apparatus.

BACKGROUND

Various types of touch panels have been developed, Examples of touch panels include one-glass-solution (OGS) touch panels, on-cell touch panels, and in-cell touch panels. The on-cell touch panels provide high touch control accuracy. The on-cell touch panels can be classified into single-layer-on-cell (SLOC) touch panels and multi-layer-on-cell (MLOC) touch panels. In particular, multiple point touch control can be achieved in the MLOC touch panels with superior touch control accuracy and blanking effects.

SUMMARY

In one aspect, the present disclosure provides a touch control display apparatus, comprising a touch control display panel; and a display and touch control driver connected to the touch control display panel; wherein the display and touch control driver comprises one or more touch integrated circuits, an oscillator, and a timing controller chip; the timing controller chip is configured to provide a horizontal synchronization signal and a vertical synchronization signal to the one or more touch integrated circuits; and the oscillator is configured to provide a same clock signal to the one or more touch integrated circuits and the timing controller chip.

Optionally, a load capacity of the oscillator is greater than a sum of a first total load and a second total load; the first total load includes an internal load of the one or more touch integrated circuits' internal oscillator and a load on a signal line connecting the oscillator and the one or more touch integrated circuits; and the second total load includes an internal load of the timing controller chip's internal oscillator and a load on a signal line connecting the oscillator and the timing controller chip.

Optionally, the display and touch control driver comprises a single touch integrated circuit.

Optionally, the display and touch control driver comprises at least a first touch integrated circuit and a second touch integrated circuit; the timing controller chip is configured to provide a horizontal synchronization signal and a vertical synchronization signal to the first touch integrated circuit and the second touch integrated circuit; and the oscillator is configured to provide a same clock signal to the first touch integrated circuit, the second touch integrated circuit, and the timing controller chip.

Optionally, the display and touch control driver further comprises a clock buffer configured to receive an input clock signal generated by the oscillator, generate multiple output clock signals that have the same frequency and phase as the input signal, and output the output clock signals to the timing controller chip and at least one of the one or more touch integrated circuits, respectively.

Optionally, the display and touch control driver comprises at least a first touch integrated circuit and a second touch integrated circuit; and the clock buffer is configured to output a first output clock signal to the timing controller chip, output a second output clock signal to the first touch integrated circuit, and output a third output clock signal to the second touch integrated circuit.

Optionally, the display and touch control driver comprises at least a first touch integrated circuit and a second touch integrated circuit; the clock buffer is configured to output a first output clock signal to the timing controller chip, and output a second output clock signal to the first touch integrated circuit; and the clock buffer does not directly output a clock signal to the second touch integrated circuit.

Optionally, the first touch integrated circuit and the second touch integrated circuit are cascaded; the first touch integrated circuit and the second touch integrated circuit are further configured to transmit a clock synchronization signal between each other; and the clock synchronization signal is configured for clock signal synchronization between the first touch integrated circuit and the second touch integrated circuit.

Optionally, the display and touch control driver comprises at least a first touch integrated circuit and a second touch integrated circuit; and the first touch integrated circuit is configured to process touch signals generated in a first mode, and the second touch integrated circuit is configured to process touch signals generated in a second mode.

Optionally, in the first mode, the first touch integrated circuit is configured to perform finger touch detection but not stylus touch detection in each frame of image.

Optionally, in the second mode, the second touch integrated circuit is configured to perform finger touch detection and stylus touch detection in each frame of image.

Optionally, the touch control display apparatus further comprises a stylus having a stylus driving chip, a wireless communication module, one or more sensors including at least one of a grip sensor and an acceleration sensor.

Optionally, the first touch integrated circuit is operated in the first mode; the grip sensor and/or the acceleration sensor are configured to detect a first state of the stylus being held by a user; the grip sensor and/or the acceleration sensor are configured to transmit a first receiving the first triggering signal by the stylus driving chip, the stylus driving chip is configured to generate downlink signals; the wireless communication module is configured to transmit a signal to a processor in the display and touch control driver; the processor is configured to transmit a signal to the first touch integrated circuit and a second touch integrated circuit; and upon receiving the signal from the processor, the first touch integrated circuit stops operating in the first mode; upon receiving the signal from the processor, the second touch integrated circuit is operated in the second mode.

Optionally, the second touch integrated circuit is operated in the second mode; the grip sensor and/or the acceleration sensor are configured to detect a second state of the stylus not being held by a user; the grip sensor and/or the acceleration sensor are configured to transmit a second triggering signal to a stylus driving chip and/or a wireless communication module; upon receiving the second triggering signal by the stylus driving chip, the stylus driving chip is configured to stop generating downlink signals; the wireless communication module is configured to transmit a signal to a processor in the display and touch control driver; the processor is configured to transmit a signal to the first touch integrated circuit and a second touch integrated circuit; upon receiving the signal from the processor, the first touch integrated circuit is operated in the first mode; and upon receiving the signal from the processor, the second touch integrated circuit stops operating in the second mode.

In another aspect, the present disclosure provides a method of operating a touch control display apparatus, wherein the touch control display apparatus includes a touch control display panel; and a display and touch control driver connected to the touch control display panel; wherein the display and touch control driver comprises one or more touch integrated circuits, an oscillator, and a timing controller chip; wherein the method comprises providing. by the timing controller chip, a horizontal synchronization signal and a vertical synchronization signal to the one or more touch integrated circuits; and providing, by the oscillator, a same clock signal to the one or more touch integrated circuits and the timing controller chip.

Optionally, the display and touch control driver comprises at least a first touch integrated circuit and a second touch integrated circuit; wherein the method comprises providing, by the timing controller chip, a horizontal synchronization signal and a vertical synchronization signal to the first touch integrated circuit and the second touch integrated circuit; and providing, by the oscillator, a same clock signal to the first touch integrated circuit, the second touch integrated circuit, and the timing controller chip.

Optionally, the display and touch control driver further comprises a clock buffer; wherein the method further comprises receiving an input clock signal generated by the oscillator; generating, by the oscillator, multiple output clock signals that have the same frequency and phase as the input signal; and outputting the output clock signals to the timing controller chip and at least one of the one or more touch integrated circuits, respectively.

Optionally, the display and touch control driver comprises at least a first touch integrated circuit and a second touch integrated circuit; wherein the method further comprises in a first mode, performing, by the first touch integrated circuit, finger touch detection but not stylus touch detection in each frame of image; and in a second mode, performing, by the second touch integrated circuit, finger touch detection and stylus touch detection in each frame of image.

Optionally, the touch control display apparatus further includes a stylus; the stylus comprises a stylus driving chip, a wireless communication module, one or more sensors including at least one of a grip sensor and an acceleration sensor; wherein the method further comprises performing, by the first touch integrated circuit, finger touch detection but not stylus touch detection in each frame of image in the first mode; detecting, by the grip sensor and/or the acceleration sensor, a first state of the stylus being held by a user; transmitting, by the grip sensor and/or the acceleration sensor, a first triggering signal to a stylus driving chip and/or a wireless communication module; generating, by the stylus driving chip, downlink signals, upon receiving the first triggering signal by the stylus driving chip; transmitting, by the wireless communication module, a signal to a processor in the display and touch control driver; transmitting, by the processor, a signal to the first touch integrated circuit and a second touch integrated circuit; and upon receiving the signal from the processor, stopping operating in the first mode by the first touch integrated circuit, and starting operating in the second mode by the second touch integrated circuit.

Optionally, the touch control display apparatus further includes a stylus; the stylus comprises a stylus driving chip, a wireless communication module, one or more sensors including at least one of a grip sensor and an acceleration sensor; wherein the method further comprises performing, by the second touch integrated circuit, finger touch detection and stylus touch detection in each frame of image in the second mode; detecting, by the grip sensor and/or the acceleration sensor, a second state of the stylus not being held by a user; transmitting, by the grip sensor and/or the acceleration sensor, a second triggering signal to a stylus driving chip and/or a wireless communication module; stopping generating downlink signals by the stylus driving chip, upon receiving the second triggering signal by the stylus driving chip; transmitting, by the wireless communication module, a signal to a processor in the display and touch control driver; transmitting, by the processor, a signal to the first touch integrated circuit and a second touch integrated circuit; and upon receiving the signal from the processor, stopping operating in the second mode by the second touch integrated circuit, and starting operating in the first mode by the first touch integrated circuit.

In another aspect, the present disclosure provides a touch control display apparatus, comprising a touch control display panel; and a display and touch control driver connected to the touch control display panel; wherein the display and touch control driver comprises one or more touch integrated circuits, an oscillator, a timing controller chip, and a clock buffer; and the clock buffer configured to receive an input clock signal generated by the oscillator. generate multiple output clock signals that have the same frequency and phase as the input signal, and output the output clock signals to the timing controller chip and at least one of the one or more touch integrated circuits, respectively.

Optionally, the display and touch control driver comprises at least a first touch integrated circuit and a second touch integrated circuit; and the clock buffer is configured to output a first output clock signal to the timing controller chip, output a second output clock signal to the first touch integrated circuit, and output a third output clock signal to the second touch integrated circuit.

Optionally, the display and touch control driver comprises at least a first touch integrated circuit and a second touch integrated circuit; the clock buffer is configured to output a first output clock signal to the timing controller chip, and output a second output clock signal to the first touch integrated circuit; and the clock buffer does not directly output a clock signal to the second touch integrated circuit.

Optionally, the first touch integrated circuit and the second touch integrated circuit are cascaded; the first touch integrated circuit and the second touch integrated circuit are further configured to transmit a clock synchronization signal between each other; and the clock synchronization signal is configured for clock signal synchronization between the first touch integrated circuit and the second touch integrated circuit.

Optionally, the display and touch control driver comprises at least a first touch integrated circuit and a second touch integrated circuit; and the first touch integrated circuit is configured to process touch signals generated in a first mode, and the second touch integrated circuit is configured to process touch signals generated in a second mode.

Optionally, in the first mode, the first touch integrated circuit is configured to perform finger touch detection but not stylus touch detection in each frame of image.

Optionally, in the second mode, the second touch integrated circuit is configured to perform finger touch detection and stylus touch detection in each frame of image.

Optionally, the touch control display apparatus further comprises a stylus having a stylus driving chip, a wireless communication module, one or more sensors including at least one of a grip sensor and an acceleration sensor.

Optionally, the first touch integrated circuit is operated in the first mode; the grip sensor and/or the acceleration sensor are configured to detect a first state of the stylus being held by a user; the grip sensor and/or the acceleration sensor are configured to transmit a first receiving the first triggering signal by the stylus driving chip, the stylus driving chip is configured to generate downlink signals; the wireless communication module is configured to transmit a signal to a processor in the display and touch control driver; the processor is configured to transmit a signal to the first touch integrated circuit and a second touch integrated circuit; and upon receiving the signal from the processor, the first touch integrated circuit stops operating in the first mode; upon receiving the signal from the processor, the second touch integrated circuit is operated in the second mode.

Optionally, the second touch integrated circuit is operated in the second mode; the grip sensor and/or the acceleration sensor are configured to detect a second state of the stylus not being held by a user; the grip sensor and/or the acceleration sensor are configured to transmit a second triggering signal to a stylus driving chip and/or a wireless communication module; upon receiving the second triggering signal by the stylus driving chip, the stylus driving chip is configured to stop generating downlink signals; the wireless communication module is configured to transmit a signal to a processor in the display and touch control driver; the processor is configured to transmit a signal to the first touch integrated circuit and a second touch integrated circuit; upon receiving the signal from the processor, the first touch integrated circuit is operated in the first mode; and upon receiving the signal from the processor, the second touch integrated circuit stops operating in the second mode.

Optionally, the timing controller chip is configured to provide a horizontal synchronization signal and a vertical synchronization signal to the one or more touch integrated circuits; and the oscillator is configured to provide a same clock signal to the one or more touch integrated circuits and the timing controller chip.

Optionally, a load capacity of the oscillator is greater than a sum of a first total load and a second total load; the first total load includes an internal load of the one or more touch integrated circuits' internal oscillator and a load on a signal line connecting the oscillator and the one or more touch integrated circuits; and the second total load includes an internal load of the timing controller chip's internal oscillator and a load on a signal line connecting the oscillator and the timing controller chip.

Optionally, the display and touch control driver comprises a single touch integrated circuit.

Optionally, the display and touch control driver comprises at least a first touch integrated circuit and a second touch integrated circuit, the timing controller chip is configured to provide a horizontal synchronization signal and a vertical synchronization signal to the first touch integrated circuit and the second touch integrated circuit; and the oscillator is configured to provide a same clock signal to the first touch integrated circuit, the second touch integrated circuit, and the timing controller chip.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
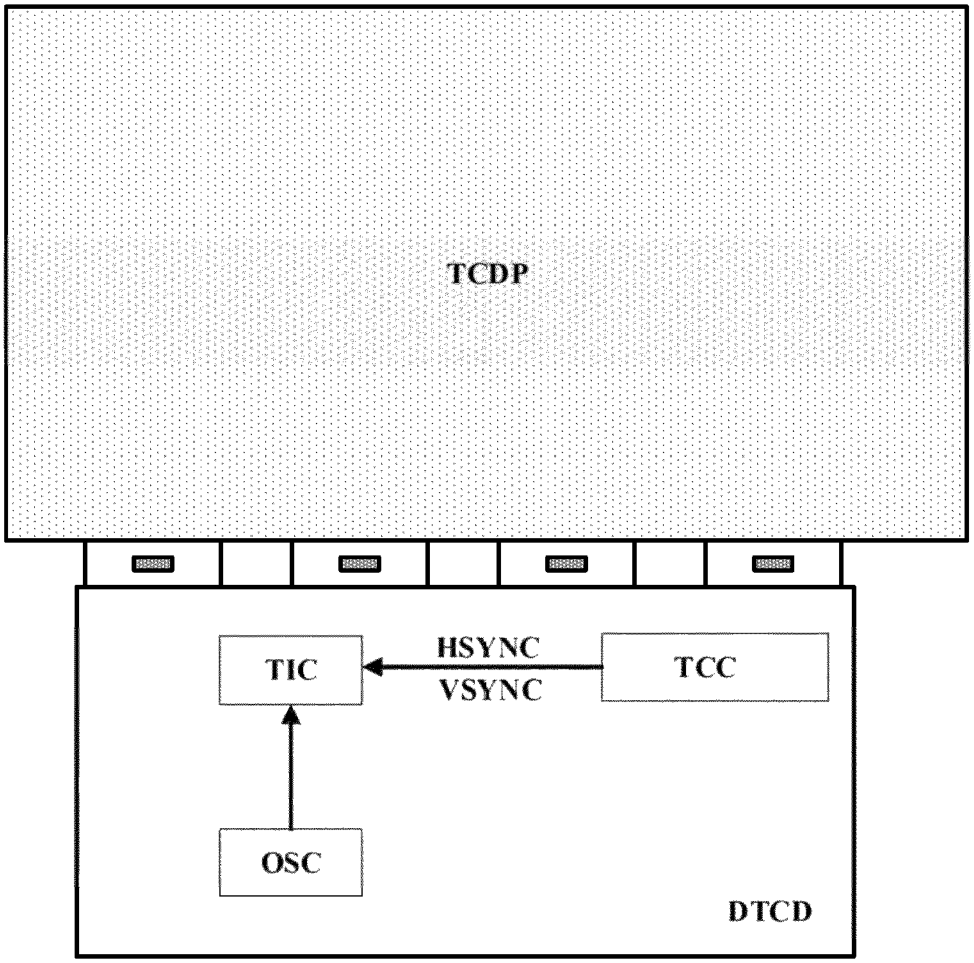
FIG. 1 is a diagram illustrating a touch control display apparatus in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

For flexible metal mesh touch control display apparatuses, the proximity of flexible metal mesh touch electrodes to the cathode leads to a large capacitive loading (parasitic capacitance between touch electrodes and the cathode), resulting in significant display noise coupled to the flexible metal mesh touch electrodes. This severely affects the touch performance of flexible metal mesh touch control display apparatuses.

In touch control display apparatuses, a horizontal synchronization signal (HSYNC) and a vertical synchronization signal (VSYNC) from the timing controller chip of the touch control display apparatuses are provided to the touch integrated circuit as reference signals for the analog-to-digital converter sampling in the analogue front end module of the touch integrated circuit. These signals help accurately avoid the display noise during the touch analog-to-digital converter sampling, reducing the introduction of display noise signals, and enhancing the touch performance of touch control display apparatuses.

In finger touch control mode, the touch integrated circuit does not require an external clock unit. The internal RC oscillator circuit within the touch integrated circuit can meet the clock requirements. However, when supporting an active pen, the working time window for the active pen and the touch module is dictated by protocol. The active pen and the touch module agree to coordinate with each other at a specific frequency. In this case, the accuracy requirement for the clock frequency is very high, and the internal RC oscillator circuit within the touch integrated circuit does not meet the frequency accuracy requirement for clock synchronization and alignment between the active pen and the touch module.

The internal clock unit of a chip is generally an internal RC oscillator circuit composed of resistors and capacitors within the integrated circuit. It has low accuracy and is influenced by various factors such as temperature and aging, resulting in rather poor frequency stability. Typically, the frequency accuracy of the internal oscillator in a conventional timing controller chip is around 1.5%-3%. For example, the built-in oscillator in a typical timing controller chip has a main frequency of Typ. 108 MHz with a frequency accuracy of ±3%. However, when supporting a capacitive active pen, the touch integrated circuit requires a frequency accuracy of ±50 ppm (parts per million) for the external clock unit.

A significant difference between the two requirements exists. When supporting a capacitive active pen, the frequency specification requirement of the clock unit for the touch integrated circuit (±50 ppm) is much higher than the frequency accuracy capability of the timing controller chip's internal oscillator (1.5%-3%). The frequency accuracy of the HSYNC. and VSYNC signals provided by the timing controller chip is difficult to meet the touch integrated circuit's analog-to-digital converter sampling reference clock precision requirement. The difficulty in achieving precise time-division sampling to avoid display noise adversely affects the active pen signal-to-noise ratio and performance of active pen touch control in the related touch control display apparatus.

Accordingly, the present disclosure provides, inter alia, a display apparatus and a method of driving a display apparatus that substantially obviate one or more of the problems due to limitations and disadvantages of the related art. In one aspect, the present disclosure provides a touch control display apparatus. In some embodiments, the touch control display apparatus includes a touch control display panel; and a display and touch control driver connected to the touch control display panel. Optionally, the display and touch control driver comprises one or more touch integrated circuits, an oscillator, and a timing controller chip. Optionally, the timing controller chip is configured to provide a horizontal synchronization signal and a vertical synchronization signal to the one or more touch integrated circuits. Optionally, the oscillator is configured to provide a same clock signal to the one or more touch integrated circuits and the timing controller chip.

FIG. 1 is a diagram illustrating a touch control display apparatus in some embodiments according to the present disclosure. Referring to FIG. 1, the touch control display apparatus in some embodiments includes a touch control display panel TCDP and a display and touch control driver DTCD connected to the touch control display panel TCDP. The display and touch control driver DTCD includes a touch integrated circuit TIC, an oscillator OSC, and a timing controller chip TCC. The touch integrated circuit TIC is the component that enables touch functionality. In some embodiments, the touch integrated circuit TIC is configured to process touch signals to determine the touch location, gesture, or other touch-related information. The timing controller chip TCC is responsible for coordinating the display panel's operation. It receives the video data from the device's graphics processor, processes it, and sends the appropriate signals to the display panel to control the timing and sequencing of the pixels. The timing controller chip TCC is configured to provide a horizontal synchronization signal (HSYNC) and a vertical synchronization signal (VSYNC) to the touch integrated circuit TIC as reference signals for the analog-to-digital converter sampling in the analogue front end module of the touch integrated circuit TIC. The oscillator OSC is a component that generates an electrical signal with a specific frequency. In a touch control display apparatus, the oscillator OSC is often used to provide the timing reference for the touch integrated circuit TIC. It ensures accurate timing synchronization between the touch input and the touch control display panel TCDP. The oscillator OSC is configured to generate a stable and consistent clock signal. It typically includes a crystal oscillator, which uses the piezoelectric properties of a crystal (usually quartz) to generate a precise and stable oscillating signal.

Figure 2:
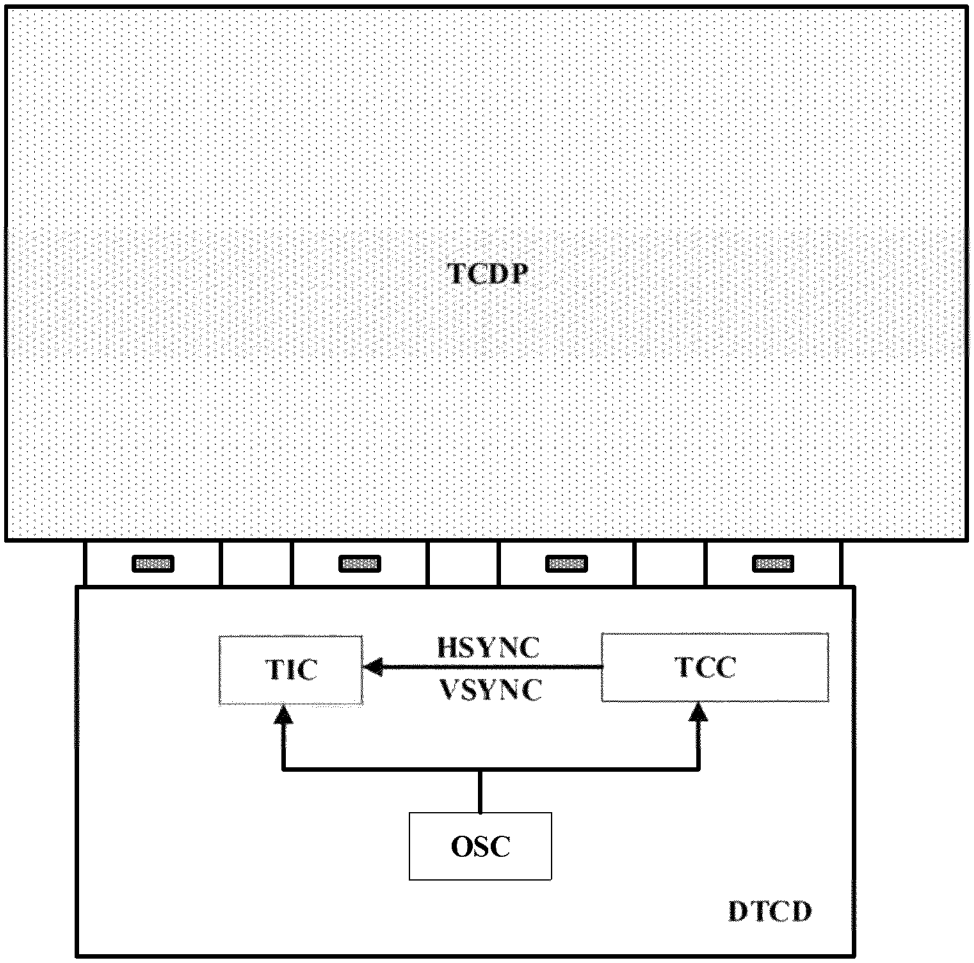
FIG. 2 is a diagram illustrating a touch control display apparatus in some embodiments according to the present disclosure.

FIG. 2 is a diagram illustrating a touch control display apparatus in some embodiments according to the present disclosure. Referring to FIG. 2, the touch control display apparatus in some embodiments includes a touch control display panel TCDP and a display and touch control driver DTCD connected to the touch control display panel TCDP. The display and touch control driver DTCD includes a touch integrated circuit TIC, an oscillator OSC, and a timing controller chip TCC.

In some embodiments, the timing controller chip TCC is configured to provide a horizontal synchronization signal and a vertical synchronization signal to the touch integrated circuit TIC as reference signals for the analog-to-digital converter sampling in the analogue front end module of the touch integrated circuit TIC. Within the analogue front end module, an analog-to-digital converter is used to convert the analog touch signals into digital data that can be processed by the touch integrated circuit TIC. During the analog-to-digital converter sampling process, it is crucial to obtain accurate and noise-free touch data. However, the display panel's operation can introduce noise that may affect the touch signal quality. To mitigate this issue, the horizontal synchronization and vertical synchronization signals are utilized as reference signals during the analog-to-digital converter sampling in the analogue front end module. The horizontal synchronization signal and the vertical synchronization signal avoid display noise during touch analog-to-digital converter sampling and reduce the introduction of display noise signals. The horizontal synchronization and vertical synchronization signals provide a precise timing reference for the analog-to-digital converter sampling. By aligning the analog-to-digital converter sampling intervals with these synchronization signals, the touch integrated circuit can avoid capturing touch data during periods when the display panel is actively refreshing and introducing noise. This helps in reducing the impact of display noise on the touch input and ensures accurate touch detection.

The horizontal synchronization signal represents the horizontal synchronization pulse, which indicates the start and end of each horizontal line on the display panel. It ensures that the pixels on each row are refreshed in the correct sequence. The vertical synchronization signal represents the vertical synchronization pulse and marks the beginning and end of each frame on the display panel. It coordinates the vertical scanning and refreshing of the pixels, ensuring smooth and coherent image rendering.

The touch integrated circuit TIC relies on the oscillator OSC to provide a stable and accurate clock signal. This clock signal is essential for synchronizing the internal operations of the touch IC and ensuring precise timing for touch detection and processing. Various appropriate oscillators may be used. Examples of appropriate oscillators include active crystal oscillators and passive crystal oscillators.

In some embodiments, the oscillator OSC is connected to the touch integrated circuit TIC and is connected to the timing controller chip TCC. In some embodiments, the oscillator OSC is configured to provide a same clock signal to the touch integrated circuit TIC and the timing controller chip TCC. The inventors of the present disclosure discover that the touch control display apparatus according to the present disclosure ensures synchronization and coordination between the touch integrated circuit TIC and the timing controller chip TCC. The touch integrated circuit TIC and the timing controller chip TCC operate on the same timing reference.

In some embodiments, a load capacity of the oscillator OSC is denoted as $C_{load}$. A first total load C1 includes an internal load of the touch integrated circuit TIC's internal oscillator and a load on a signal line connecting the oscillator OSC and the touch integrated circuit TIC. A second total load C2 includes an internal load of the timing controller chip TCC's internal oscillator and a load on a signal line connecting the oscillator OSC and the timing controller chip TCC. In some embodiments, the load capacity $C_{load}$ of the oscillator OSC is greater than a sum of the first total load C1 and the second total load C2. The inventors of the present disclosure discover that this ensures that the load on the oscillator OSC remains within its acceptable range to maintain proper clock signal integrity and reliable operation of both the touch integrated circuit TIC and the timing controller chip TCC.

In some embodiments, the touch control display apparatus according to the present disclosure is a medium-sized flexible touch control display apparatus, in which typically a single touch integrated circuit is sufficient for driving the touch detection. In one example, the screen size of the flexible touch control display apparatus is equal to or less than 14-15.6 inches.

Figure 3:
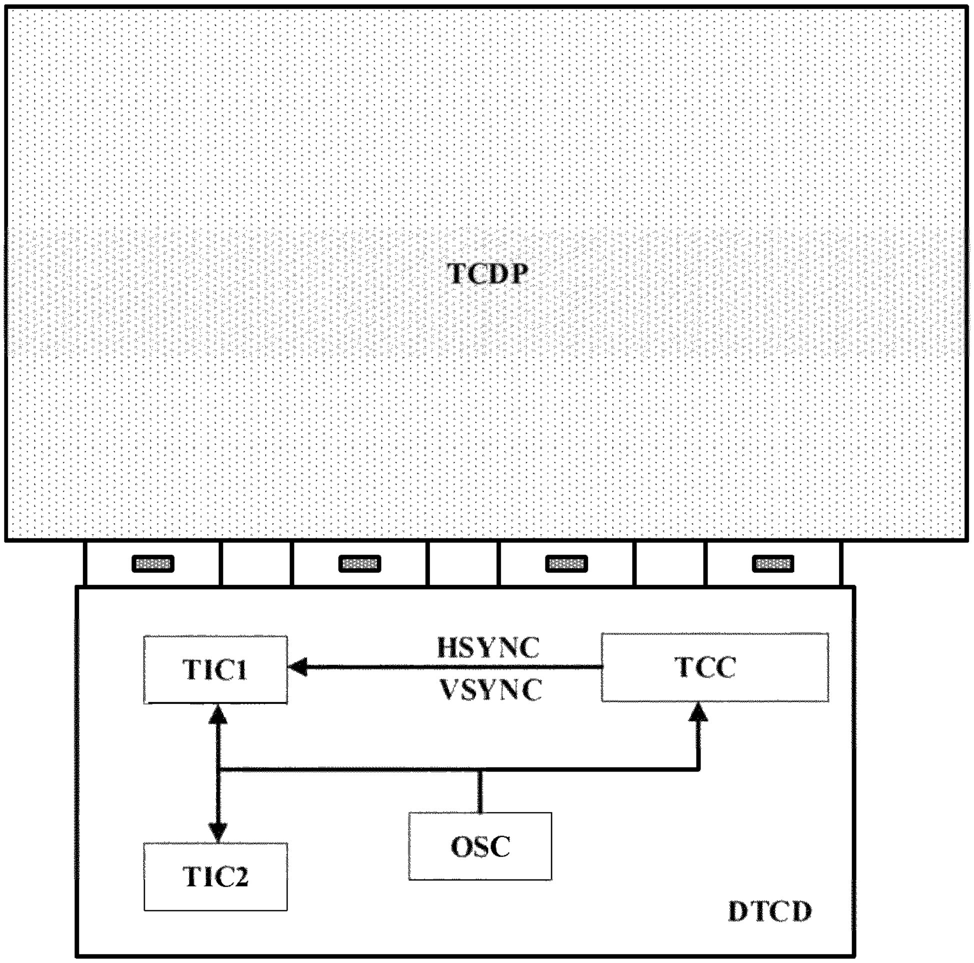
FIG. 3 is a diagram illustrating a touch control display apparatus in some embodiments according to the present disclosure.

FIG. 3 is a diagram illustrating a touch control display apparatus in some embodiments according to the present disclosure. Referring to FIG. 3, the touch control display apparatus in some embodiments includes a touch control display panel TCDP and a display and touch control driver DTCD connected to the touch control display panel TCDP. The display and touch control driver DTCD includes a first touch integrated circuit TIC1, a second touch integrated circuit TIC2, an oscillator OSC, and a timing controller chip TCC.

In some embodiments, the timing controller chip TCC is configured to provide a horizontal synchronization signal and a vertical synchronization signal to the first touch integrated circuit TIC1 and the second touch integrated circuit TIC2 as reference signals for the analog-to-digital converter sampling in the analogue front end modules of the first touch integrated circuit TIC1 and the second touch integrated circuit TIC2. Within the analogue front end modules, an analog-to-digital converter is used to convert the analog touch signals into digital data that can be processed by the first touch integrated circuit TIC1 and the second touch integrated circuit TIC2. During the analog-to-digital converter sampling process, it is crucial to obtain accurate and noise-free touch data. However, the display panel's operation can introduce noise that may affect the touch signal quality. To mitigate this issue, the horizontal synchronization and vertical synchronization signals are utilized as reference signals during the analog-to-digital converter sampling in the analogue front end module. The horizontal synchronization signal and the vertical synchronization signal avoid display noise during touch analog-to-digital converter sampling and reduce the introduction of display noise signals. The horizontal synchronization and vertical synchronization signals provide a precise timing reference for the analog-to-digital converter sampling. By aligning the analog-to-digital converter sampling intervals with these synchronization signals, the touch integrated circuit can avoid capturing touch data during periods when the display panel is actively refreshing and introducing noise. This helps in reducing the impact of display noise on the touch input and ensures accurate touch detection.

The first touch integrated circuit TIC1 and the second touch integrated circuit TIC2 rely on the oscillator OSC to provide a stable and accurate clock signal. This clock signal is essential for synchronizing the internal operations of the touch IC and ensuring precise timing for touch detection and processing. Various appropriate oscillators may be used. Examples of appropriate oscillators include active crystal oscillators and passive crystal oscillators.

In some embodiments, the oscillator OSC is connected to the first touch integrated circuit TIC1, is connected to the second touch integrated circuit TIC2, and is connected to the timing controller chip TCC, In some embodiments, the oscillator OSC is configured to provide a same clock signal to the first touch integrated circuit TIC1, the second touch integrated circuit TIC2, and the timing controller chip TCC. The inventors of the present disclosure discover that the touch control display apparatus according to the present disclosure ensures synchronization and coordination among the first touch integrated circuit TIC1, the second touch integrated circuit TIC2, and the timing controller chip TCC. The first touch integrated circuit TIC1, the second touch integrated circuit TIC2, and the timing controller chip TCC operate on the same timing reference.

In some embodiments, the touch control display apparatus according to the present disclosure is a medium to large-sized flexible touch control display apparatus, in which typically two or more touch integrated circuits are needed for driving the touch detection. In one example, the screen size of the flexible touch control display apparatus is equal to or greater than 14-15.6 inches. Typically, the loading and driving capabilities of a single crystal oscillator are very limited. Even for active crystal oscillators with stronger driving capabilities. the loading capacity is typically in the range of several picofarads to tens of picofarads. Therefore, it is commonly required to place the crystal oscillator close to the chip pins in the integrated circuit (e.g., a touch integrated circuit or a timing controller chip), with a typical distance requirement of ≤10 mm.

Referring to FIG. 3, in some embodiments, the oscillator OSC is configured to provide a same clock signal to three integrated circuits (including the first touch integrated circuit TIC1, the second touch integrated circuit TIC2, and the timing controller chip TCC). The first touch integrated circuit TIC1, the second touch integrated circuit TIC2, and the timing controller chip TCC are typically spaced apart from each other in the display and touch control driver DTCD. Accordingly, the oscillator OSC is typically disposed near only one of the three integrated circuits. Due to the long wiring length (much greater than 10 mm, ranging from 50-100 mm), and the need to drive multiple integrated circuits, the loading and driving capabilities of the active crystal oscillator in the oscillator OSC are often insufficient, adversely affecting the integrity of the clock signal. This results in severe signal reflections, causing problems such as monotonicity, overshoot, and ringing in the clock signal, which may lead to false triggering and system clock failure.

Figure 4:
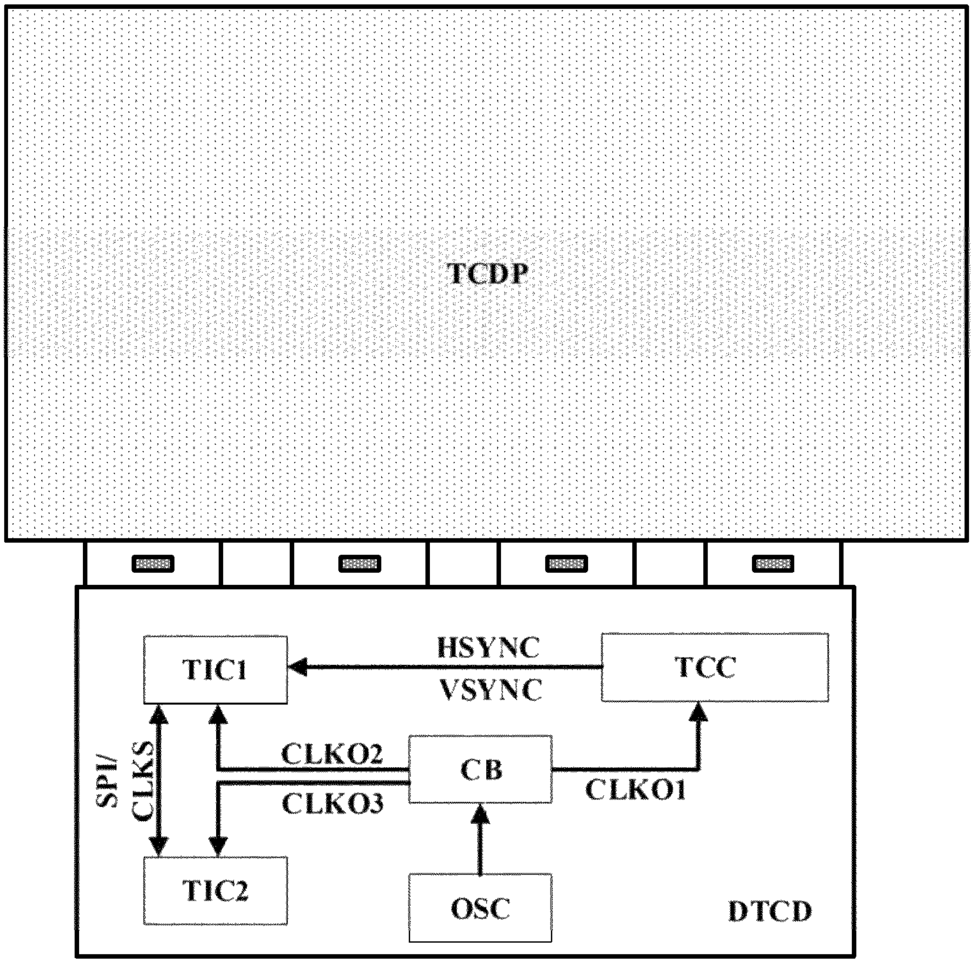
FIG. 4 is a diagram illustrating a touch control display apparatus in some embodiments according to the present disclosure.

FIG. 4 is a diagram illustrating a touch control display apparatus in some embodiments according to the present disclosure. Referring to FIG. 4, the touch control display apparatus in some embodiments includes a touch control display panel TCDP and a display and touch control driver DTCD connected to the touch control display panel TCDP. The display and touch control driver DTCD in some embodiments includes a first touch integrated circuit TIC1, a second touch integrated circuit TIC2, an oscillator OSC, a timing controller chip TCC, and a clock buffer CB.

In some embodiments, the clock buffer CB is connected to the oscillator OSC, is connected to the timing controller chip TCC, is connected to the first touch integrated circuit TIC1, and is connected to the second touch integrated circuit TIC2. The clock buffer CB is configured to strengthen and replicate clock signals. The clock buffer CB is configured to receive an input clock signal and generates multiple output clock signals that have the same frequency and phase as the input signal. The inventors of the present disclosure discover that the clock buffer CB is able to distribute clock signals accurately and reliably to multiple integrated circuits, including the timing controller chip TCC, the first touch integrated circuit TIC1, and the second touch integrated circuit TIC2. The inventors of the present disclosure discover that, by having a clock buffer CB in the display and touch control driver DTCD, it helps maintain signal integrity by minimizing signal degradation and reducing the effects of loading or impedance mismatching.

In some embodiments, the clock buffer CB is configured to receive a single clock source signal generated by an active crystal oscillator and replicates it into multiple clock signals through frequency replication. Optionally, the clock buffer CB is configured to incorporate functionalities such as clock distribution, format conversion, and level shifting. The clock buffer CB is capable of supporting multiple clock outputs while selecting buffers with low added phase jitter, low output skew, and low input-output delay. Optionally, the clock buffer CB includes cascaded inverters IVT and a logic control circuit LC.

Figure 5:
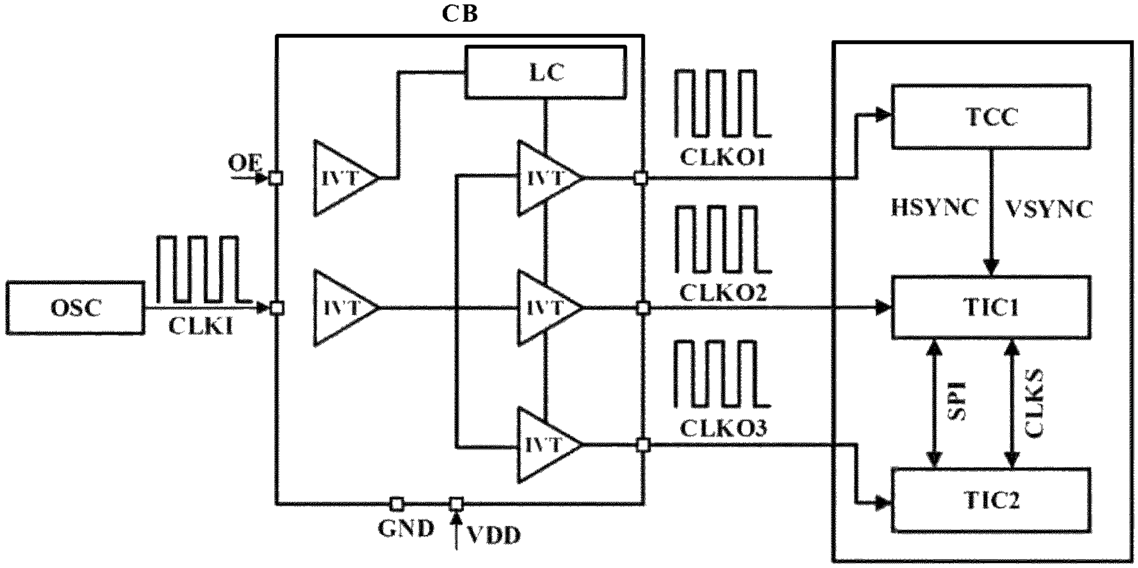
FIG. 5 illustrates a process of replication of a single clock signal into multiple clock signals by a clock buffer in some embodiments according to the present disclosure.

FIG. 5 illustrates a process of replication of a single clock signal into multiple clock signals by a clock buffer in some embodiments according to the present disclosure, Referring to FIG. 4 and FIG. 5, the oscillator OSC in some embodiments is configured to provide an input clock signal CLK1 to the clock buffer CB.

In some embodiments, the clock buffer CB is configured to receive the input clock signal CLK1. Optionally, the clock buffer CB is further configured to receive an output enabling signal OE, The output enabling signal OE is configured to enable or disable the output of a particular device or circuit. When the output enabling signal OE is asserted (active), the output of the device or circuit is enabled and can actively drive the signal. On the other hand, when the output enabling signal OE is de-asserted (inactive), the output is disabled, effectively disconnecting it from the rest of the system. In the clock buffer CB depicted in FIG. 5, the output enabling signal OE is utilized to control the enabling or disabling of the clock signal outputs. When the output enabling signal OE is active, the clock buffer will drive the output clock signals, allowing them to propagate through the system. Conversely, when the output enabling signal OE is inactive, the clock buffer will disable the output clock signals, effectively isolating them and preventing their propagation. The output enabling signal OF provides a means of controlling the operation of the clock buffer and can be used to synchronize or control the timing of the clock signals within a system.

In some embodiments, the clock buffer CB is further configured to receive a ground signal GND.

In some embodiments, the clock buffer CB is further configured to receive a voltage supply signal VDD. Optionally, the clock buffer CB is configured to receive the voltage supply signal VDD from a low dropout regulator. The low dropout regulator supplies the clock buffer with strong driving capability and stable power input, thereby preventing clock jitter caused by fluctuations in the power supply voltage of the clock buffer.

In some embodiments, the clock buffer CB is further configured to output a first output clock signal CLKO1 to the timing controller chip TCC, output a second output clock signal CLKO2 to the first touch integrated circuit TIC1, and output a third output clock signal CLKO3 to the second touch integrated circuit TIC2. In some embodiments, the first touch integrated circuit TIC1 and the second touch integrated circuit TIC2 are cascaded.

In some embodiments, the first touch integrated circuit TIC1 and the second touch integrated circuit TIC2 are configured to transmit a serial peripheral interface signal SPI between each other. The serial peripheral interface signal SPI facilitates the exchange of data between the first touch integrated circuit TIC1 and the second touch integrated circuit TIC2.

In some embodiments, the first touch integrated circuit TIC1 and the second touch integrated circuit TIC2 are further configured to transmit a clock synchronization signal CLKS between each other. The clock synchronization signal CLKS is a signal used for touch state confirmation between the first touch integrated circuit TIC1 and the second touch integrated circuit TIC2. It serves as a synchronization signal between the first touch integrated circuit TIC1 and the second touch integrated circuit TIC2, allowing them to coordinate and verify the touch input state or status.

In the present touch control display apparatus, the timing controller chip TCC, the first touch integrated circuit TIC1, and the second touch integrated circuit TIC2 shares a same high-precision clock signal source (e.g., the oscillator OSC). Under control of the clock signals generated by the clock buffer CB, the timing controller chip TCC, the first touch integrated circuit TIC1, and the second touch integrated circuit TIC2 are configured to perform tasks such as data reception and transmission, signal sampling, and processing. The frequency accuracy of the horizontal synchronization signal HSYNC and vertical synchronization signal VSYNC provided by the timing controller chip TCC to the first touch integrated circuit TIC1 and the second touch integrated circuit TIC2 can be significantly improved. The horizontal synchronization signal HSYNC and the vertical synchronization signal VSYNC from the timing controller chip TCC are provided to the first touch integrated circuit TIC1 and the second touch integrated circuit TIC2 as reference signals for the analog-to-digital converter sampling in the analogue front end module of the touch integrated circuit. These signals help accurately avoid the display noise during the touch analog-to-digital converter sampling. reducing the introduction of display noise signals, and enhancing the touch performance of touch control display apparatuses.

Figure 6:
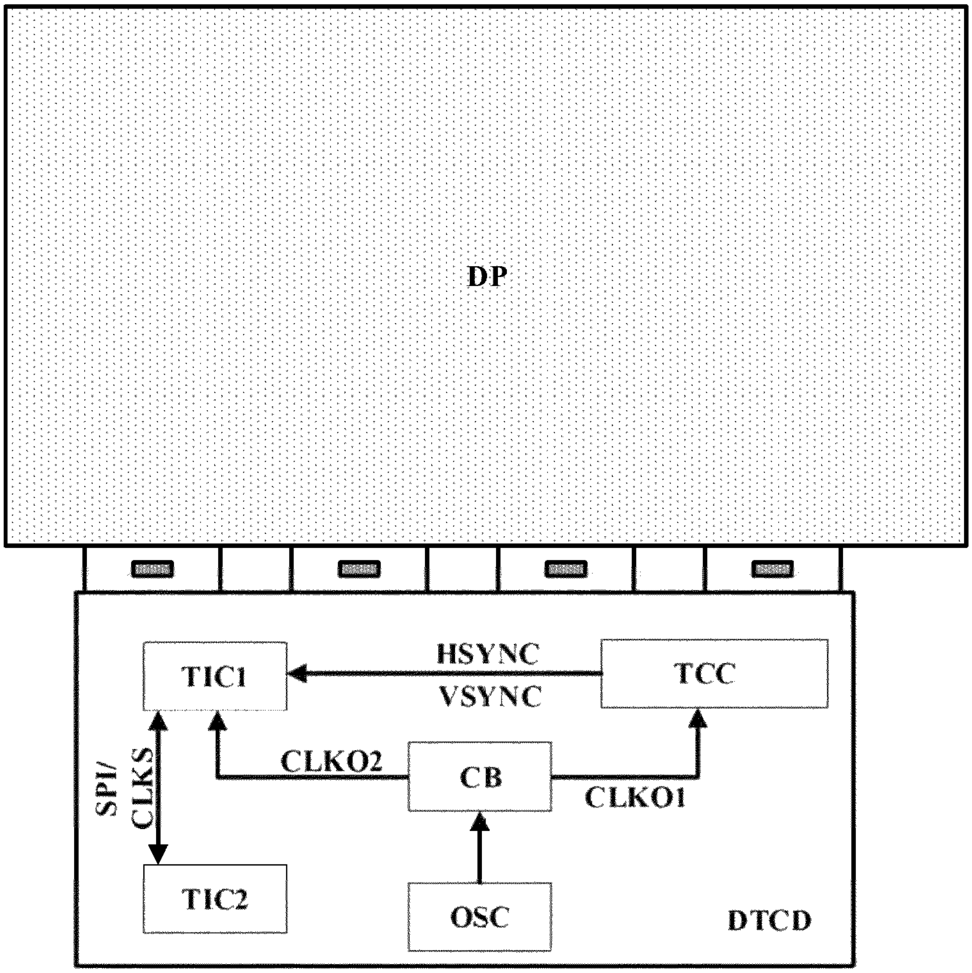
FIG. 6 is a diagram illustrating a touch control display apparatus in some embodiments according to the present disclosure.
Figure 7:
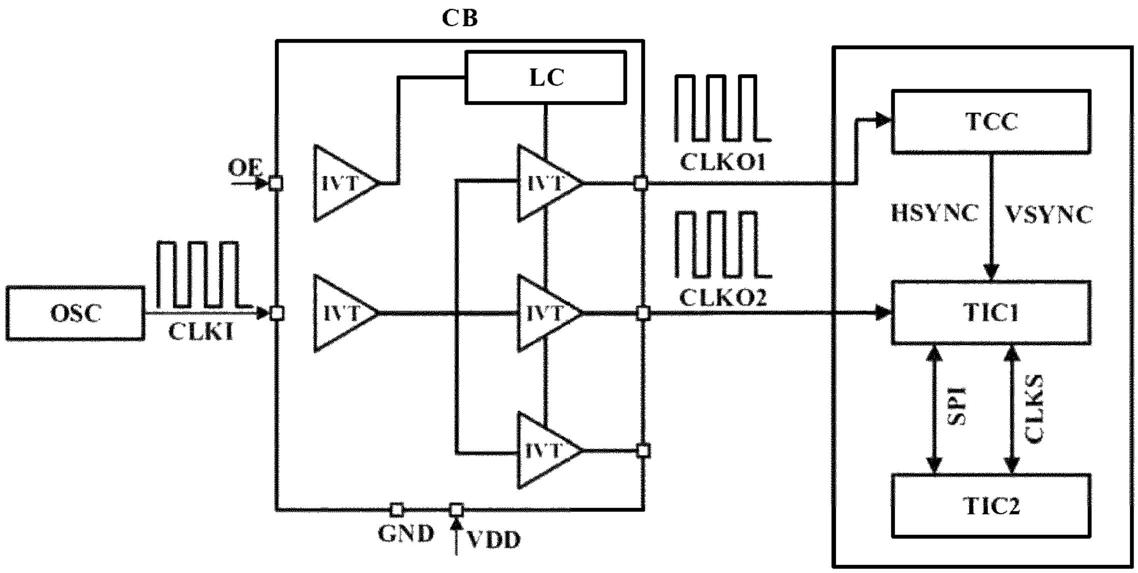
FIG. 7 illustrates a process of replication of a single clock signal into multiple clock signals by a clock buffer in some embodiments according to the present disclosure.

FIG. 6 is a diagram illustrating a touch control display apparatus in some embodiments according to the present disclosure. FIG. 7 illustrates a process of replication of a single clock signal into multiple clock signals by a clock buffer in some embodiments according to the present disclosure. Referring to FIG. 6 and FIG. 7, in some embodiments, the clock buffer CB is configured to receive the input clock signal CLK1; and is configured to output a first output clock signal CLKO1 to the timing controller chip TCC, output a second output clock signal CLKO2 to the first touch integrated circuit TIC1. The clock buffer CB does not directly output a clock signal to the second touch integrated circuit TIC2.

In some embodiments, the first touch integrated circuit TIC1 and the second touch integrated circuit TIC2 are cascaded. In some embodiments, the first touch integrated circuit TIC1 and the second touch integrated circuit TIC2 are further configured to transmit a clock synchronization signal CLKS between each other. Optionally, the clock synchronization signal CLKS transmitted between the first touch integrated circuit TIC1 and the second touch. integrated circuit TIC2 is used for clock signal synchronization between the first touch integrated circuit TIC1 and the second touch integrated circuit TIC2. Accordingly, the second touch integrated circuit TIC2 is configured to obtain a clock signal from the first touch integrated circuit TIC1 through the clock signal synchronization by the clock synchronization signal CLKS.

In some embodiments, the clock buffer CB is further configured to receive an output enabling signal OE. The output enabling signal OE is configured to enable or disable the output of a particular device or circuit. In the clock buffer CB depicted in FIG. 6, the output enabling signal OE is utilized to control the enabling or disabling of the clock signal outputs. When the output enabling signal OE is active, the clock buffer will drive the output clock signals, allowing them to propagate through the system. Conversely, when the output enabling signal OE is inactive, the clock buffer will disable the output clock signals, effectively isolating them and preventing their propagation.

In some embodiments, the first touch integrated circuit TIC1 and the second touch integrated circuit TIC2 are configured to transmit a serial peripheral interface signal SPI between each other. The serial peripheral interface signal SPI facilitates the exchange of data between the first touch integrated circuit TIC1 and the second touch integrated circuit TIC2.

The inventors of the present disclosure discover that, in the present touch control display apparatus, the timing controller chip TCC and the clock buffer CB in combination provide clock signals to at least one of the first touch integrated circuit TIC1 and the second touch integrated circuit TIC2, simultaneously. The clock buffer CB enhances the driving capability of the clock signals, resulting in well-defined rising and falling edges of the clock signal. The clock buffer CB has a small input load and a strong output driving capability. Therefore, it is easier for a preceding circuit to drive the clock buffer CB, and the clock buffer CB can drive the subsequent chip circuits more effectively. The present touch control display apparatus effectively addresses the issues of insufficient load capacity and driving capability of the crystal oscillator in the related touch control display apparatus, ensuring the integrity of the clock signal.

The inventors of the present disclosure further discover that the present touch control display apparatus, by having the timing controller chip TCC and the clock buffer CB in combination to provide clock signals to at least one of the first touch integrated circuit TIC1 and the second touch integrated circuit TIC2, simultaneously, further address the issue of clock level mismatch. For example, the clock signal for the touch integrated circuit operates at 1.8V, while the clock signal for the timing controller chip TCC operates at 1.2V. The clock buffer CB can incorporate level-shifting functionality, allowing it to generate separate clock signals with the required voltage levels for both the touch integrated circuit(s) and the timing controller chip TCC.

The inventors of the present disclosure further discover that the present touch control display apparatus, by having the timing controller chip TCC and the clock buffer CB in combination to provide clock signals to at least one of the first touch integrated circuit TIC1 and the second touch integrated circuit TIC2, simultaneously, further address the issue of clock frequency mismatch. For example, the clock signal for the touch integrated circuit operates at 64 MHz, while the clock signal for the timing controller chip TCC operates at 108 MHz. In some embodiments, the clock buffer CB is one with phase locked loop functionality, allowing for frequency multiplication and division, enabling the clock buffer CB to generate different frequency clock signals on its different output channels as required.

Figure 8:
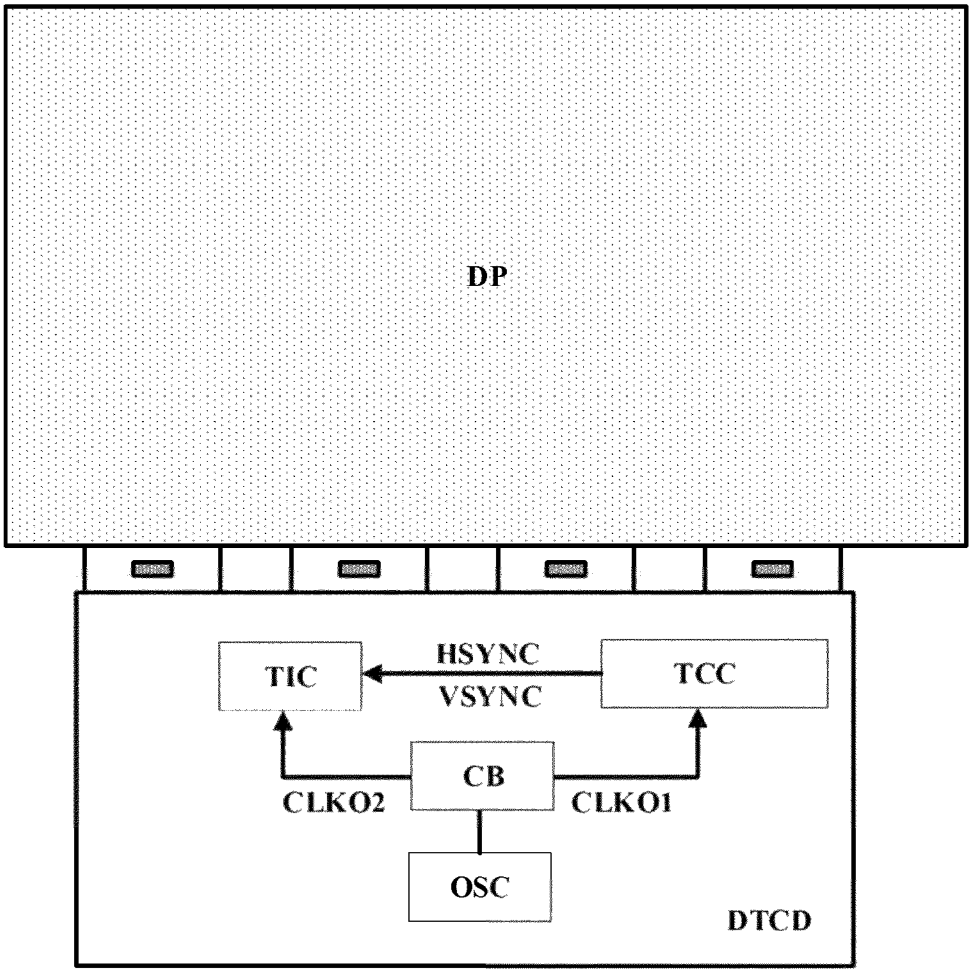
FIG. 8 is a diagram illustrating a touch control display apparatus in some embodiments according to the present disclosure.
Figure 9:
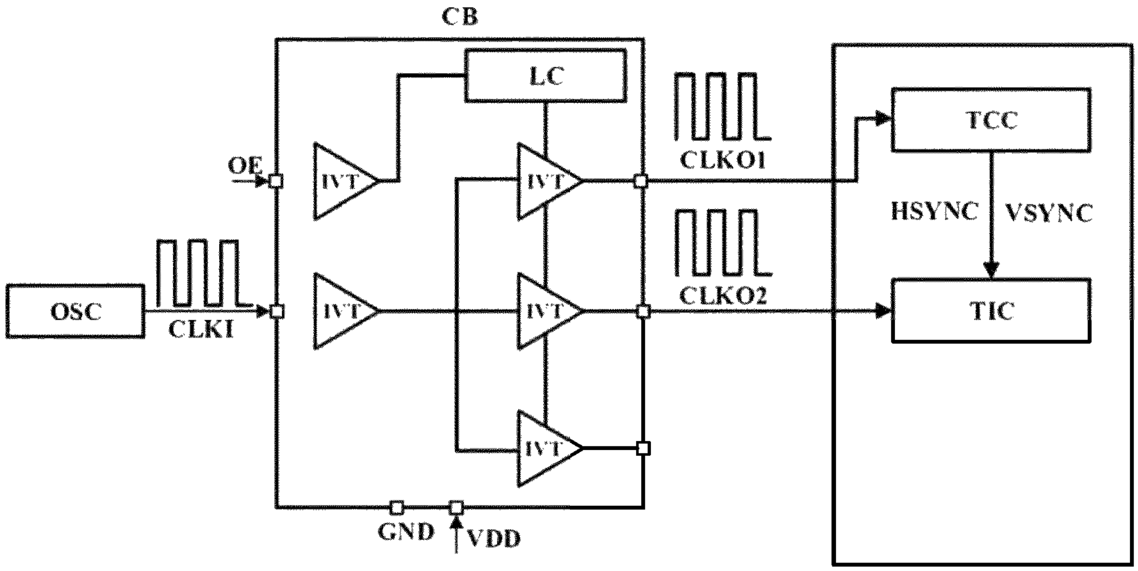
FIG. 9 illustrates a process of replication of a single clock signal into multiple clock signals by a clock buffer in some embodiments according to the present disclosure.

Various alternative implementations may be practiced in the present disclosure, For example, the clock buffer CB may be included in touch control display apparatus having a single touch integrated circuit. FIG. 8 is a diagram illustrating a touch control display apparatus in some embodiments according to the present disclosure. FIG. 9 illustrates a process of replication of a single clock signal into multiple clock signals by a clock buffer in some embodiments according to the present disclosure. Referring to FIG. 8 and FIG. 9, in some embodiments, the clock buffer CB is configured to receive the input clock signal CLK1; and is configured to output a first output clock signal CLKO1 to the timing controller chip TCC, output a second output clock signal CLKO2 to the touch integrated circuit TIC.

The touch control display apparatus according to the present disclosure utilizes a timing controller chip for the display touch panel, and all the touch integrated circuits of the touch control display apparatus use the same external clock unit, and operating with a same clock signal. At the same time, a clock buffer is added between the external clock unit and the touch integrated circuits and the timing controller chip, enhancing the driving capability of the external clock unit.

The inventors of the present disclosure discover that the touch control display apparatus according to the present disclosure obviates issues in the related touch control display apparatus, particularly one with an active pen touch system. These issues include, for example, the separation of touch integrated circuit clock signal and display timing controller clock, insufficient synchronization accuracy of synchronization signals, and inadequate clock driving capability. The touch control display apparatus according to the present disclosure can overall enhance the frequency accuracy of the synchronization signal provided by the timing controller chip to the touch integrated circuit, ensuring accurate and time-division acquisition of touch signals by the touch integrated circuit. Consequently, the touch control display apparatus according to the present disclosure significantly improves the signal-to-noise ratio and performance of the active pen touch on the touch control display apparatus.

Various alternative implementations may be practiced in the present disclosure. With the development of display technology, there is an increasing demand for higher finger touch report rate. For example, finger touch report rate for mobile products have increased from 240 Hz to 360 Hz, or even 480 Hz. For tablet products that only support finger touch detection, the finger touch report rate is generally greater than 180 Hz. For tablet products that support both finger touch detection and stylus touch detection, the finger touch report rate is generally in the range of 100 Hz to 120 Hz when only finger touch is performed. For tablet products that support both finger touch detection and stylus touch detection, the finger touch report rate lowers to approximately 60 Hz when both finger touch and stylus touch are performed at the same time. Finger touch report rate refers to the frequency at which a touch input from a finger is detected and reported by a touch sensing system. It represents how often the system updates and registers the position of the finger on the touch screen. A higher report rate means that the touch input is captured and processed more frequently, resulting in smoother and more responsive touch interactions. The report rate is typically measured in Hertz (Hz), indicating the number of reports per second.

Figure 10:
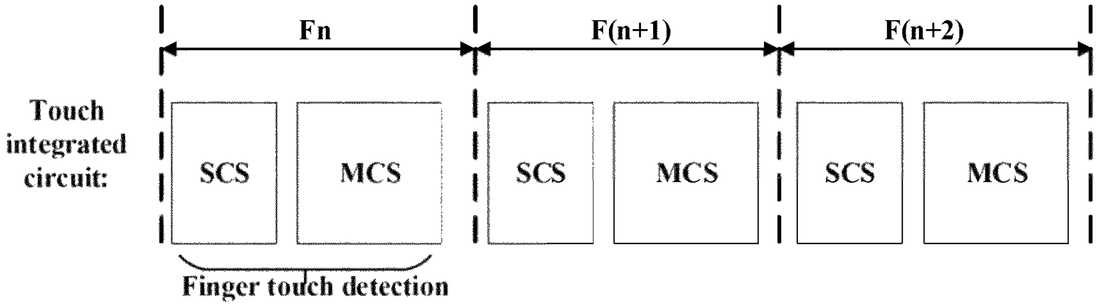
FIG. 10 illustrates a process of finger touch detection in a touch control display apparatus in some embodiments according to the present disclosure.

FIG. 10 illustrates a process of finger touch detection in a touch control display apparatus in some embodiments according to the present disclosure. Referring to FIG. 10, a plurality of frames of images are shown, including an n-th frame of image Fn, a (n+1)-th frame of image F(n+1), and a (n+2)-th frame of image F(n+2). In each frame of image, the touch integrated circuit is configured to perform finger touch detection. The finger touch detection includes detecting a self-capacitance signal SCS and detecting a mutual-capacitance signal MCS.

Figure 11:
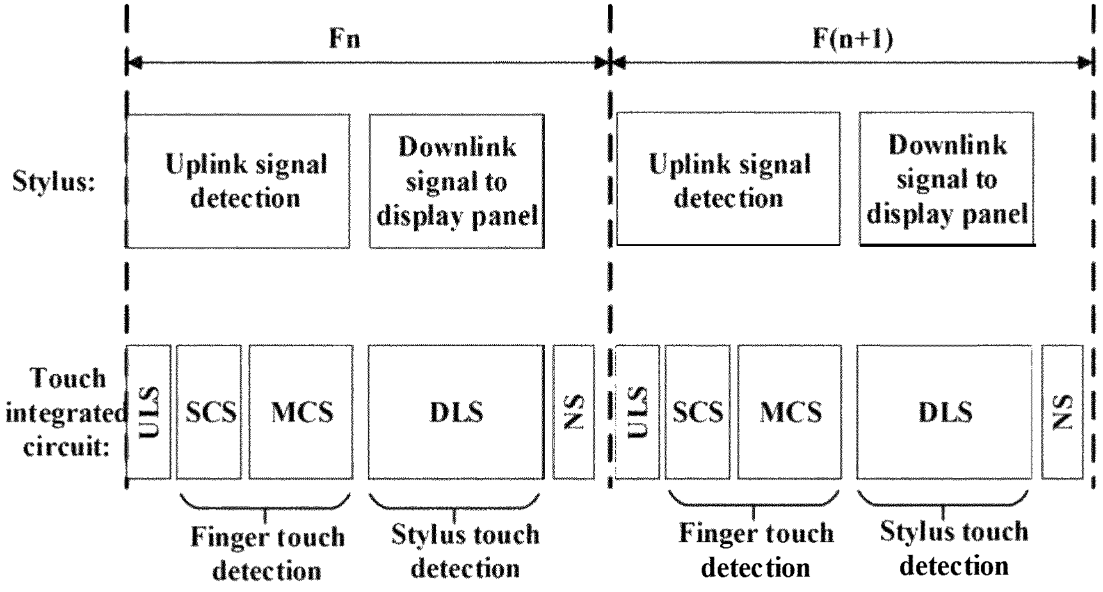
FIG. 11 illustrates a process of finger touch and stylus touch detection in a touch control display apparatus in some embodiments according to the present disclosure.

FIG. 11 illustrates a process of finger touch and stylus touch detection in a touch control display apparatus in some embodiments according to the present disclosure. Referring to FIG. 11, a plurality of frames of images are shown, including an n-th frame of image Fn and a (n+1)-th frame of image F(n+1). In each frame of image, the stylus is configured to first perform an uplink signal detection detecting signals transmitted from a touch control display panel to the stylus, e.g., through various wireless means such as Bluetooth or electromagnetic resonance. The stylus is then configured to downlink signals to the touch control display panel, e.g., transmitting signals to the touch control display panel.

In each frame of image, the touch integrated circuit is configured to transmit an uplink signal ULS to the stylus, perform finger touch detection, perform stylus touch detection, and perform a noise signal detection. The finger touch detection includes detecting a self-capacitance signal SCS and detecting a mutual-capacitance signal MCS. The stylus touch detection includes detecting a downlink signal DLS transmitted from the stylus. The noise signal detection includes detecting a noise signal NS.

The finger report rate can typically be improved by increasing the touch driving frequency of the touch integrated circuit. The touch driving frequency refers to the frequency at which the transmitter of a touch integrated circuit sends signals to the touch panel or touchscreen. This frequency determines how often the touch integrated circuit updates and sends electrical signals to the touch panel to detect touch inputs. By increasing the touch driving frequency, the touch integrated circuit can capture touch inputs more frequently, resulting in a higher report rate and improved responsiveness of the touch system. A higher touch driving frequency allows for faster and more accurate detection of touch events on the touch panel.

As shown in FIG. 10 and FIG. 11, when the touch control display apparatus is configured to detect finger touch and stylus touch simultaneously, the touch integrated circuit needs to be operated in a time-division mode comprising a finger touch detection mode and a stylus touch detection mode. In each frame of image, the touch integrated circuit is configured to perform finger touch detection and stylus touch detection. As a result, it is difficult to further increase the finger report rate by simply raising the touch driving frequency. Even when the stylus is not touching the screen, the touch integrated circuit still needs to detect in real-time whether the user is about to make a stylus input. Thus, due to the limitations imposed by the sampling time of the touch integrated circuit, the finger report rate for touch control display apparatuses that support finger touch and stylus touch simultaneously is typically around 100 Hz to 120 Hz. The stylus touch report rate may vary depending on various protocols. For example, the stylus touch report rate is 266 Hz under MPP protocol, 360 Hz under HPP protocol, about 240 Hz under USI protocol, and about 240 Hz under AES protocol. A higher finger touch report rate is particularly challenging when the HPP protocol is utilized for stylus touch detection.

Figure 12:
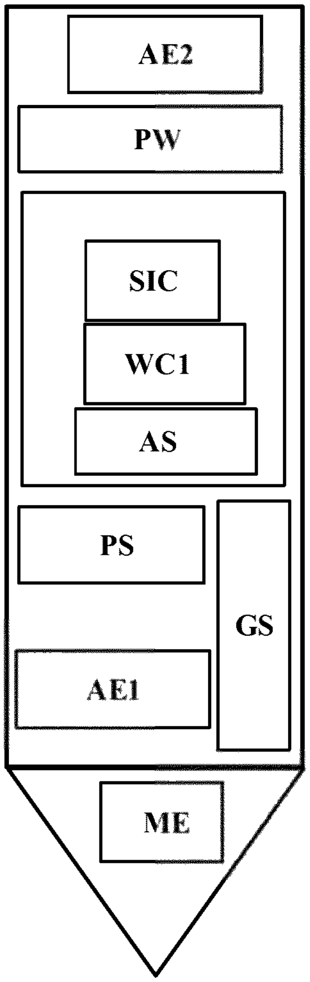
FIG. 12 is a diagram illustrating the structure of a stylus in some embodiments according to the present disclosure.

FIG. 12 is a diagram illustrating the structure of a stylus in some embodiments according to the present disclosure, Referring to FIG. 12, the stylus in some embodiments includes a plurality of electrodes and a plurality of sensors. Optionally, the plurality of electrodes include a main electrode ME, a first auxiliary electrode AE1, a second auxiliary electrode AE2. Optionally, the plurality of sensors includes a grip sensor GS, an acceleration sensor AS, and a pressure sensor PS.

The grip sensor GS is configured to detect how the stylus is being held by a user. In some embodiments, the grip sensor OS is configured to detect a contact between the user's finger and a casing of the stylus. In some embodiments, the grip sensor GS is configured to detect an interaction between the user and the stylus, for example, whether the user is actively gripping the stylus or if it is idle. Various appropriate grip sensors may be implemented in the present disclosure. In one example, the grip sensor GS utilizes a pressure sensitive material. In another example, the grip sensor GS includes a force sensor. In another example, the grip sensor GS is embedded within the casing of the stylus. In some embodiments, the grip sensor OS is a multi-channel sensor capable of simultaneously sensing grip signals from multiple positions on the sensor.

The pressure sensor PS is configured to detect the amount of pressure applied to the stylus. In some embodiments, the pressure sensor PS is configured to measures the force exerted by the user and convert it into a corresponding digital signal. The pressure sensitivity information captured by the pressure sensor PS may be used to enable features like variable line thickness or shading in digital drawing or handwriting applications. It provides a level of control and precision that is not possible with a grip sensor alone.

The acceleration sensor AS is configured to detect changes in acceleration and movement, allowing the stylus to detect and respond to various motion-related actions. In some embodiments, the acceleration sensor AS is configured to detect acceleration along multiple axes (typically three axes: X, Y, and Z) and provides information about the movement, orientation, and tilt of the stylus in real-time. This enables the stylus to offer additional functionalities and interactions beyond simple touch input.

The main electrode ME is the primary conducting element in the stylus, It is responsible for transmitting electrical signals to the touch control display panel when the stylus tip makes contact with the surface of the touch control display panel. When the stylus touches the surface of the touch control display panel, the main electrode ME allows the transfer of electrical charges, which the touch control display panel can detect and interpret as a touch input.

The first auxiliary electrode AE1 is an additional conducting element configured to provide enhanced functionality or features, typically related to stylus orientation or tilt detection. By measuring the electrical characteristics between the first auxiliary electrode AE1 and the main electrode ME, the stylus can determine the angle or tilt at which it is held relative to the touch control display panel. This information enables features like tilt-based shading or precise pen orientation tracking.

The second auxiliary electrode AE2 is an additional conducting element in the stylus configured to provide further functionality or capabilities, depending on the specific design and implementation. The second auxiliary electrode AE2 may serve purposes such as enhancing signal transmission, improving accuracy, or enabling additional interaction modes beyond touch input.

In some embodiments, the stylus further includes a stylus driving chip SIC configured to manage and control the functionality of the stylus. In some embodiments, the stylus driving chip SIC is configured to process various inputs and outputs to enable accurate and responsive stylus interaction with the touch control display panel.

In some embodiments, the stylus further includes a first wireless communication module WC1 configured to allow wireless communication such as data exchange between the stylus and the touch control display panel. In one example, the first wireless communication module WC1 includes a Bluetooth.

In some embodiments, the stylus further includes a power source PW configured to supply power to the stylus. Optionally, the power source PW is further configured to facilitate the charging of the stylus when the power is depleted.

Figure 13:
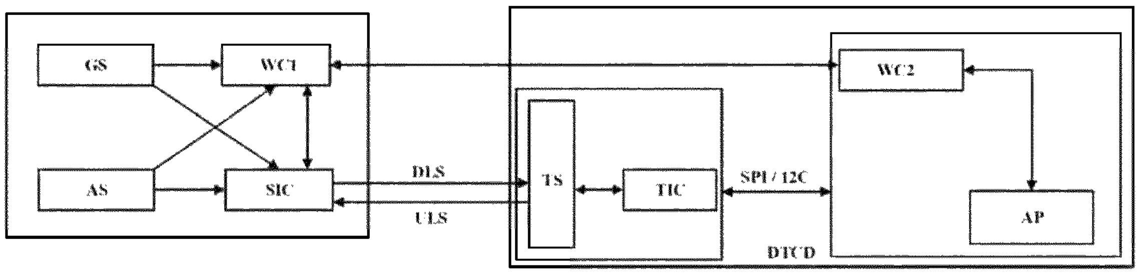
FIG. 13 illustrates an operation of a touch control display panel and a stylus in some embodiments according to the present disclosure.

FIG. 13 illustrates an operation of a touch control display panel and a stylus in some embodiments according to the present disclosure. Referring to FIG. 13, the stylus in some embodiments includes a grip sensor GS, an acceleration sensor AS, a stylus driving chip SIC; and a first wireless communication module WC1. The grip sensor GS is configured to transmit data to the stylus driving chip SIC, and to the first wireless communication module WC1. The acceleration sensor AS is configured to transmit data to the stylus driving chip SIC, and to the first wireless communication module WC1.

The touch control display apparatus in some embodiments includes a display and touch control driver DTCD connected to a touch control display panel. In some embodiments. the display and touch control driver DTCD includes a touch sensor TS including a plurality of touch electrodes, and a touch integrated circuit TIC connected to the touch sensor TS. The touch sensor TS is configured to transmit an uplink signal ULS to the stylus driving chip SIC. in the stylus, and configured to receive a downlink signal DLS from the stylus driving chip SIC. The stylus driving chip SIC is configured to transmit the downlink signal DLS to the touch sensor TS, and configured to receive the uplink signal ULS from the touch sensor TS.

In some embodiments, the display and touch control driver DTCD further includes a second wireless communication module WC2 and an access point AP. The second wireless communication module WC2 is connected to the access point AP. In some embodiments, the second wireless communication module WC2 is in wireless communication with the first wireless communication module WC1 in the stylus. The access point AP is a connection point for wireless devices to connect to a wired network.

Figure 14:
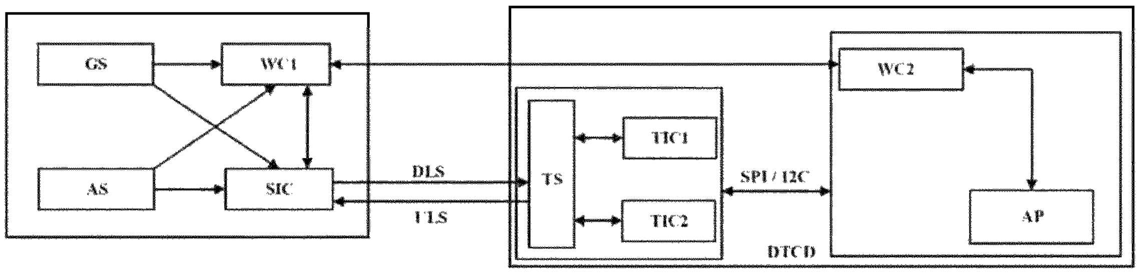
FIG. 14 illustrates an operation of a touch control display panel and a stylus in some embodiments according to the present disclosure.

In some embodiments, the touch integrated circuit TIC and the access point AP are configured to transmit a serial peripheral interface signal SPI between each other. In some embodiments, the touch integrated circuit TIC and the access point AP are further configured to transmit an inter-integrated circuit signal 12C between each other, FIG. 14 illustrates an operation of a touch control display panel and a stylus in some embodiments according to the present disclosure. Referring to FIG. 14, the display and touch control driver DTCD in some embodiments includes a first touch integrated circuit TIC1 and a second touch integrated circuit TIC2, as discussed in FIG. 3 to FIG. 7 and associated descriptions. In some embodiments, the first touch integrated circuit TIC1 is configured to process touch signals generated in a first mode, and the second touch integrated circuit TIC2 is configured to process touch signals generated in a second mode. Optionally, the first mode is a mode in which only finger touch is detected (e.g., the mode depicted in FIG. 10). Optionally, the second mode is a mode in which both finger touch and stylus touch are detected (e.g., the mode depicted in FIG. 11). In one example, in the first mode, the finger touch detection is supported while the stylus touch detection is not supported. In another example, in the second mode, both the finger touch detection and the stylus touch detection are supported.

In some embodiments, in the first mode, the touch integrated circuit is configured to perform finger touch detection in each frame of image. Referring to FIG. 10, in some embodiments, the finger touch detection includes detecting a self-capacitance signal SCS and detecting a mutual-capacitance signal MCS.

In some embodiments, in the second mode, the touch integrated circuit is configured to perform finger touch detection and stylus touch detection in each frame of image. Referring to FIG. 11, in each frame of image, the stylus is configured to first perform an uplink signal detection detecting signals transmitted from a touch control display panel to the stylus, e.g., through various wireless means such as Bluetooth or electromagnetic resonance. The stylus is then configured to downlink signals to the touch control display panel, e.g., transmitting signals to the touch control display panel.

In some embodiments, in the second mode, the touch integrated circuit is configured to, in each frame of image, transmit an uplink signal ULS to the stylus, perform finger touch detection, perform stylus touch detection, and perform a noise signal detection. The finger touch detection includes detecting a self-capacitance signal SCS and detecting a mutual-capacitance signal MCS. The stylus touch detection includes detecting a downlink signal DLS transmitted from the stylus. The noise signal detection includes detecting a noise signal NS.

In some embodiments, a relatively higher finger report rate can be achieved in the first mode, In one example, the finger report rate in the first mode is in the range of 180 Hz to 240 Hz.

In some embodiments, a relatively lower finger report rate can be achieved in the second mode. In one example, the finger report rate in the second mode is about 60 Hz, and the stylus touch report rate is in the range of 240 Hz to 360 Hz.

Figure 15:
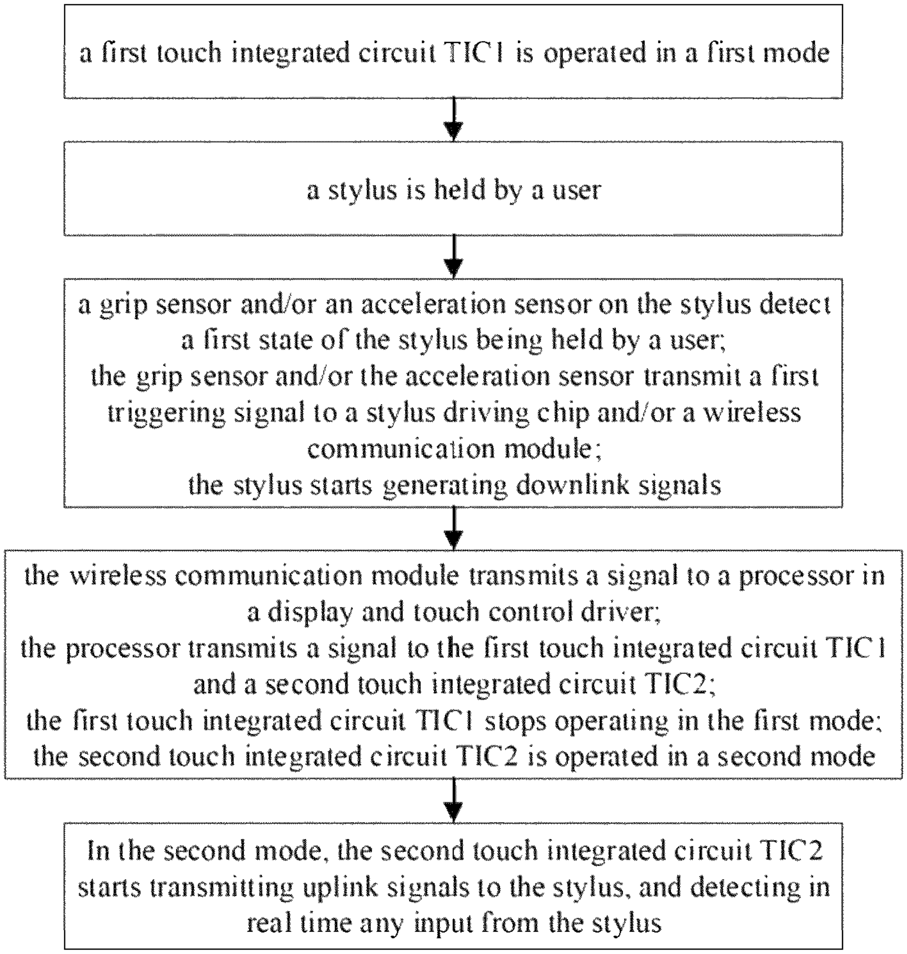
FIG. 15 illustrates a process of switching from a first mode to a second mode in some embodiments according to the present disclosure.

FIG. 15 illustrates a process of switching from a first mode to a second mode in some embodiments according to the present disclosure. Referring to FIG. 15, initially a first touch integrated circuit TIC1 is operated in a first mode. Subsequently, a stylus is held by a user. A grip sensor and/or an acceleration sensor on the stylus detect a first state of the stylus being held by a user. The grip sensor and/or the acceleration sensor transmit a first triggering signal to a stylus driving chip and/or a wireless communication module. The stylus starts generating downlink signals.

The wireless communication module transmits a signal to a processor in a display and touch control driver. The processor transmits a signal to the first touch integrated circuit TIC1 and a second touch integrated circuit TIC2. The first touch integrated circuit TIC1 stops operating in the first mode. The second touch integrated circuit TIC2 is operated in a second mode.

In the second mode, the second touch integrated circuit TIC2 starts transmitting uplink signals to the stylus, and detecting in real time any input from the stylus.

Figure 16:
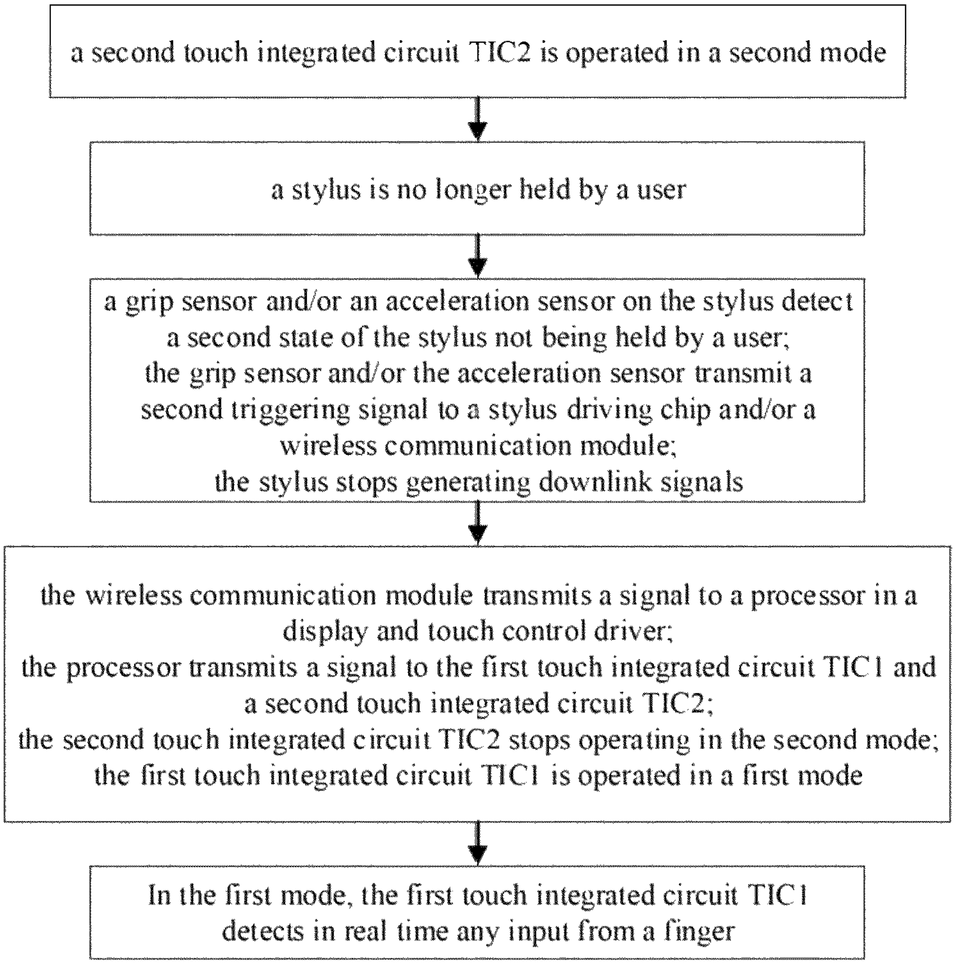
FIG. 16 illustrates a process of switching from a second mode to a first mode in some embodiments according to the present disclosure.

FIG. 16 illustrates a process of switching from a second mode to a first mode in some embodiments according to the present disclosure. Referring to FIG. 16, initially a second touch integrated circuit TIC2 is operated in a second mode. Subsequently, a stylus is no longer held by a user. A grip sensor and/or an acceleration sensor on the stylus detect a second state of the stylus not being held by a user. The grip sensor and/or the acceleration sensor transmit a second triggering signal to a stylus driving chip and/or a wireless communication module. The stylus stops generating downlink signals.

The wireless communication module transmits a signal to a processor in a display and touch control driver. The processor transmits a signal to the first touch integrated circuit TIC1 and a second touch integrated circuit TIC2. The second touch integrated circuit TIC2 stops operating in the second mode. The first touch integrated circuit TIC1 is operated in a first mode.

In the first mode, the first touch integrated circuit TIC1 detects in real time any input from a finger.

In some embodiments, a finger report rate in the first mode is higher than a finger report rate in the second mode.

In some embodiments, the grip sensor and the acceleration sensor collaborate synergistically to accurately detect the user's grip on the stylus. In one example, when the user holds the stylus, pressure signals from multiple positions on the grip sensor exceed a threshold value. The acceleration sensor detects changes in the acceleration magnitude of the active stylus, allowing it to identify and recognize the predetermined motion posture. By working in conjunction, these two sensors provide valuable insights into the user's interaction with the stylus. They can determine whether the user is about to utilize the stylus, ascertain if the user is actively using the stylus, and subsequently determine the operational state of the stylus and the appropriate working mode selection for the touch integrated circuits.

Referring to FIG. 14 and FIG. 15, in some embodiments, the first touch integrated circuit TIC1 is operated in a first mode; the grip sensor GS and/or the acceleration sensor AS are configured to detect a first state of the stylus being held by a user; the grip sensor GS and/or the acceleration sensor AS are configured to transmit a first triggering signal to a stylus driving chip SIC and/or a wireless communication module WC; upon receiving the first triggering signal by the stylus driving chip SIC, the stylus driving chip SIC is configured to generate downlink signals.

In some embodiments, the wireless communication module WC is configured to transmit a signal to a processor in a display and touch control driver; the processor is configured to transmit a signal to the first touch integrated circuit TIC1 and a second touch integrated circuit TIC2; upon receiving the signal from the processor, the first touch integrated circuit TIC1 stops operating in the first mode; upon receiving the signal from the processor, the second touch integrated circuit TIC2 is operated in a second mode.

In some embodiments, in the second mode, the second touch integrated circuit TIC2 is configured to transmit uplink signals to the stylus, and is configured to detect in real time any input from the stylus.

Referring to FIG. 14 and FIG. 16, in some embodiments, the second touch integrated circuit TIC2 is operated in a second mode; the grip sensor GS and/or the acceleration sensor AS are configured to detect a second state of the stylus not being held by a user; the grip sensor GS and/or the acceleration sensor AS are configured to transmit a second triggering signal to a stylus driving chip SIC and/or a wireless communication module WC; upon receiving the second triggering signal by the stylus driving chip SIC, the stylus driving chip SIC is configured to stop generating downlink signals.

In some embodiments, the wireless communication module WC is configured to transmit a signal to a processor in a display and touch control driver; the processor is configured to transmit a signal to the first touch integrated circuit TIC1 and a second touch integrated circuit TIC2; upon receiving the signal from the processor, the first touch integrated circuit TIC1 is operated in a first mode; upon receiving the signal from the processor, the second touch integrated circuit TIC2 stops operating in the second mode.

In some embodiments, in the first mode, the first touch integrated circuit TIC1 is configured to detect in real time any input from a finger.

Figure 17:
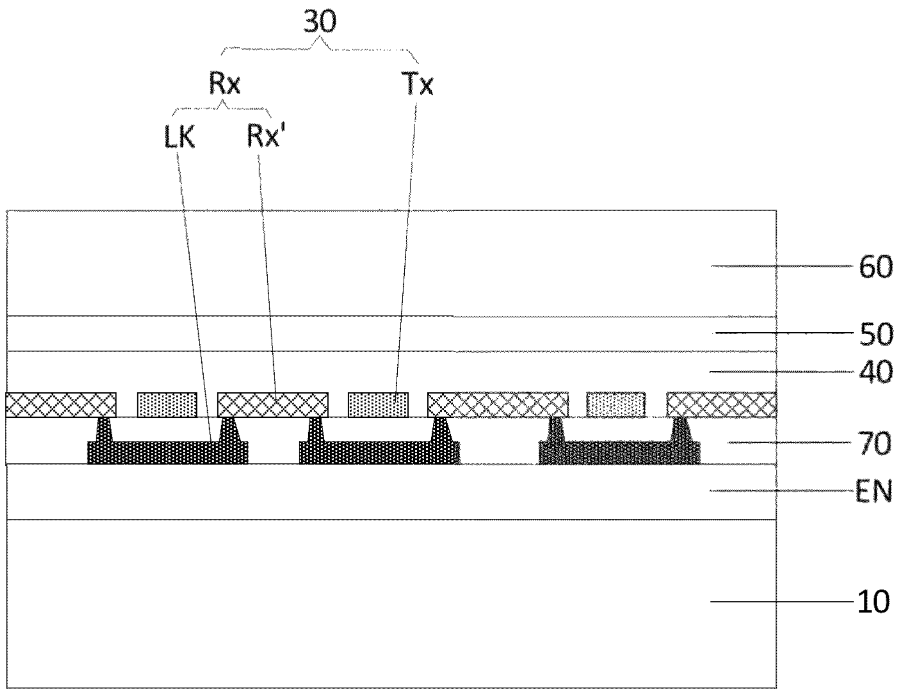
FIG. 17 is a schematic diagram of a touch control display panel in some embodiments according to the present disclosure.

Various appropriate touch control display panels may be implemented in the present disclosure. FIG. 17 is a schematic diagram of a touch control display panel in some embodiments according to the present disclosure. Referring to FIG. 17, the touch control display panel in some embodiments includes, sequentially stacked, a display panel 10, an encapsulation layer EN, a touch structure 30, a polarizing film 40, an optical adhesive 50, and a cover plate 60. The touch structure 30 is directly fabricated on the encapsulation layer EN of the display panel 10. The touch structure 30 can adopt a Metal Mesh architecture, where the first touch electrode Tx and the second touch electrode Rx are located on the same film layer, working together with a touch IC to achieve touch functionality.

Figure 18:
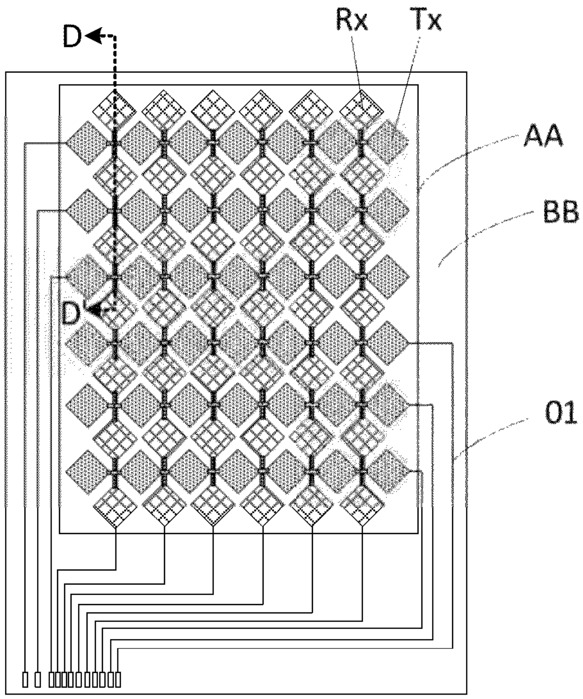
FIG. 18 is a schematic diagram of the touch lead routing method for a touch structure in some embodiments according to the relevant technology.

FIG. 18 is a schematic diagram of the touch lead routing method for a touch structure in some embodiments according to the relevant technology. Referring to FIG. 18, the touch structure 30 in some embodiments includes the first touch electrode Tx and the second touch electrode Rx, which are insulated and crossed, along with touch leads 01. The touch leads 01 are electrically connected to their corresponding first touch electrode Tx and second touch electrode Rx. The touch leads 01 extend from the touch display area AA to the surrounding area BB. In flexible multi-layer on cell (FMLOC) technology, all touch leads 01 are led to the binding area on the underside of the substrate. As a result, the lengths of the touch leads 01 connected to different touch electrodes vary. Longer touch leads 01 have larger RC loading, causing significant attenuation of the active pen signal, making it difficult to meet the performance requirements of mainstream customers for active pen functionality.

Figure 19:
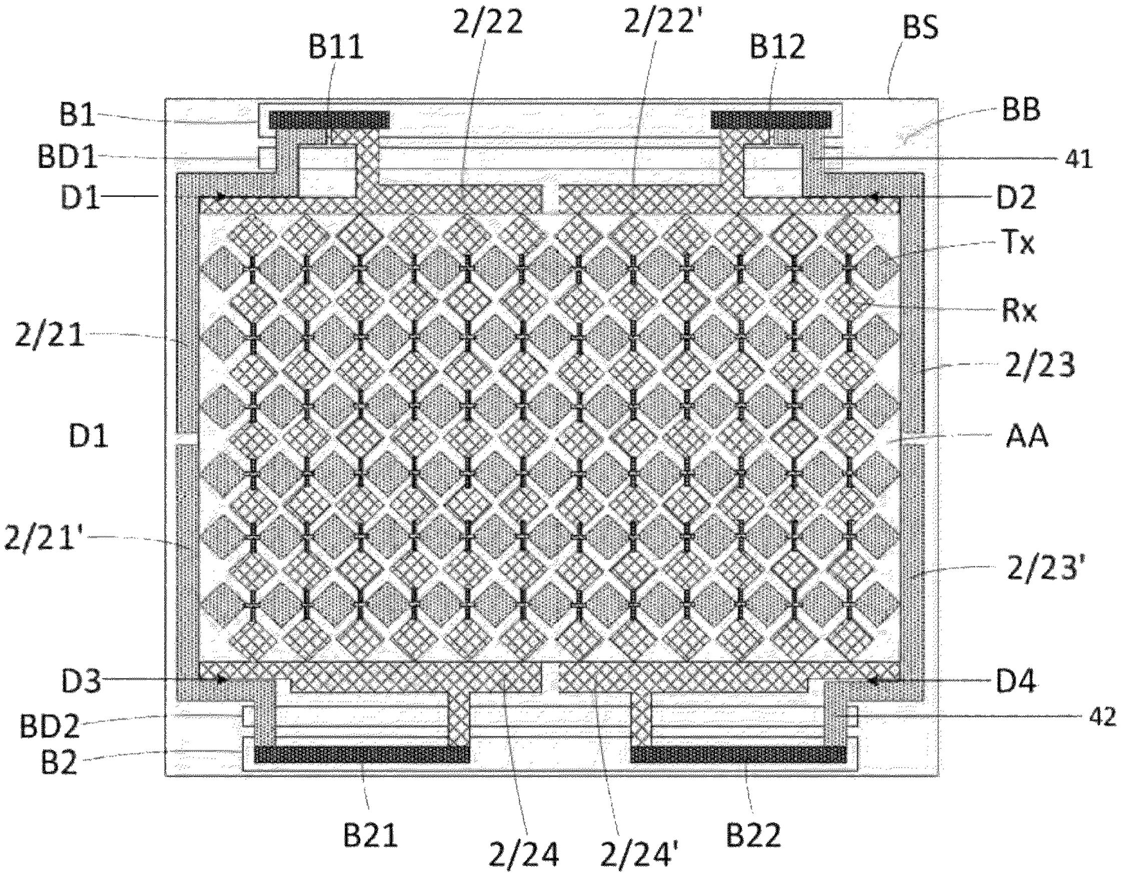
FIG. 19 is a schematic diagram of the structure of a touch control display panel in some embodiments according to the present disclosure.
Figure 20:
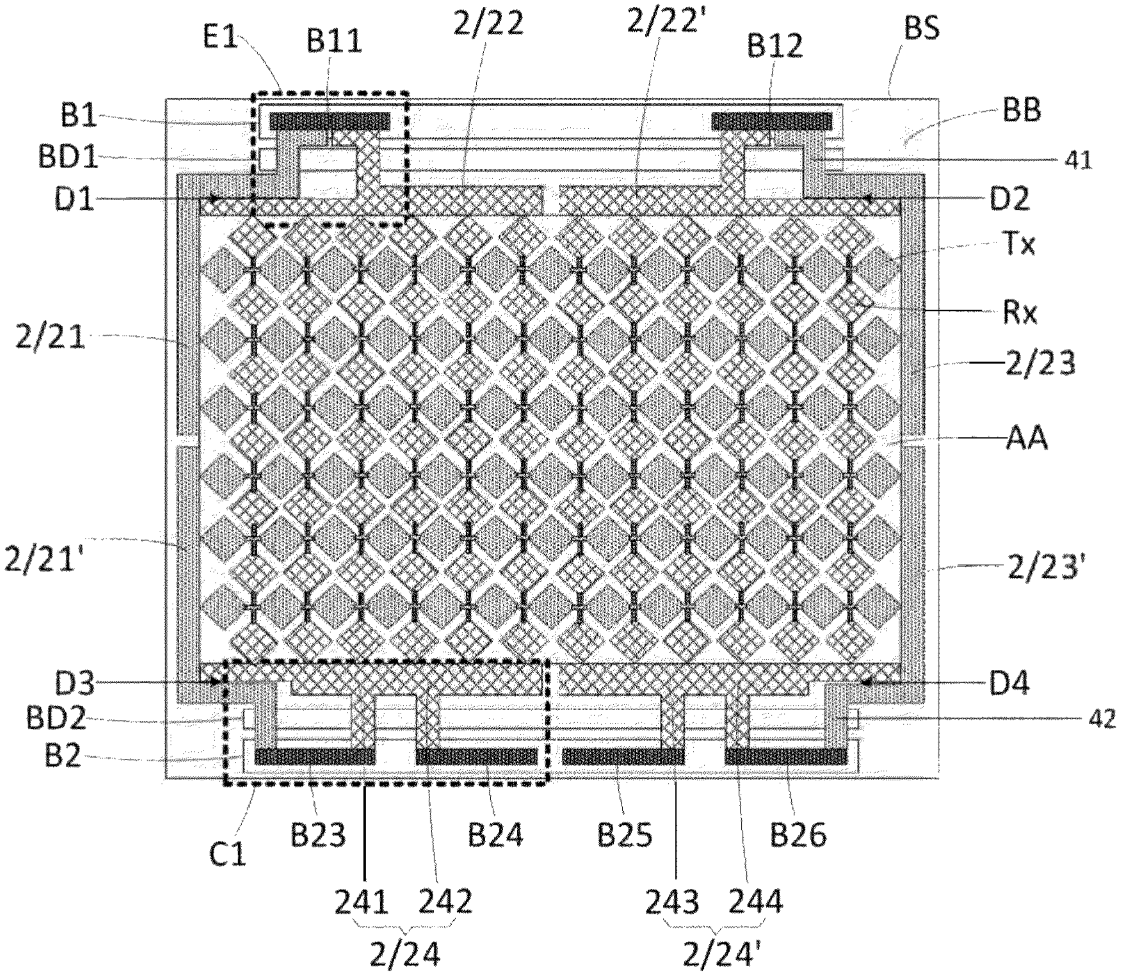
FIG. 20 is another schematic diagram of a touch control display panel in some embodiments according to the present disclosure.
Figure 21:
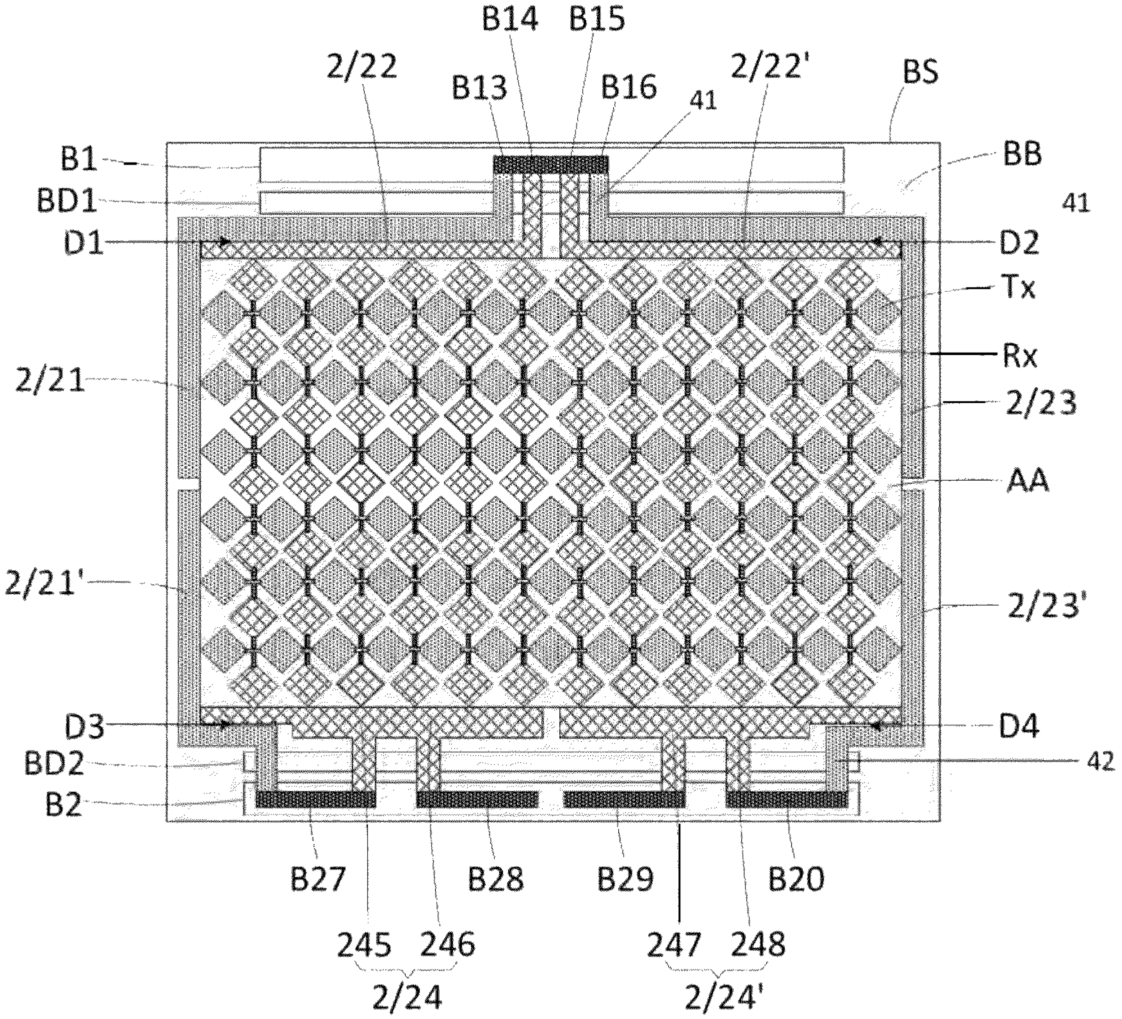
FIG. 21 is another schematic diagram of a touch control display panel in some embodiments according to the present disclosure.
Figure 22:
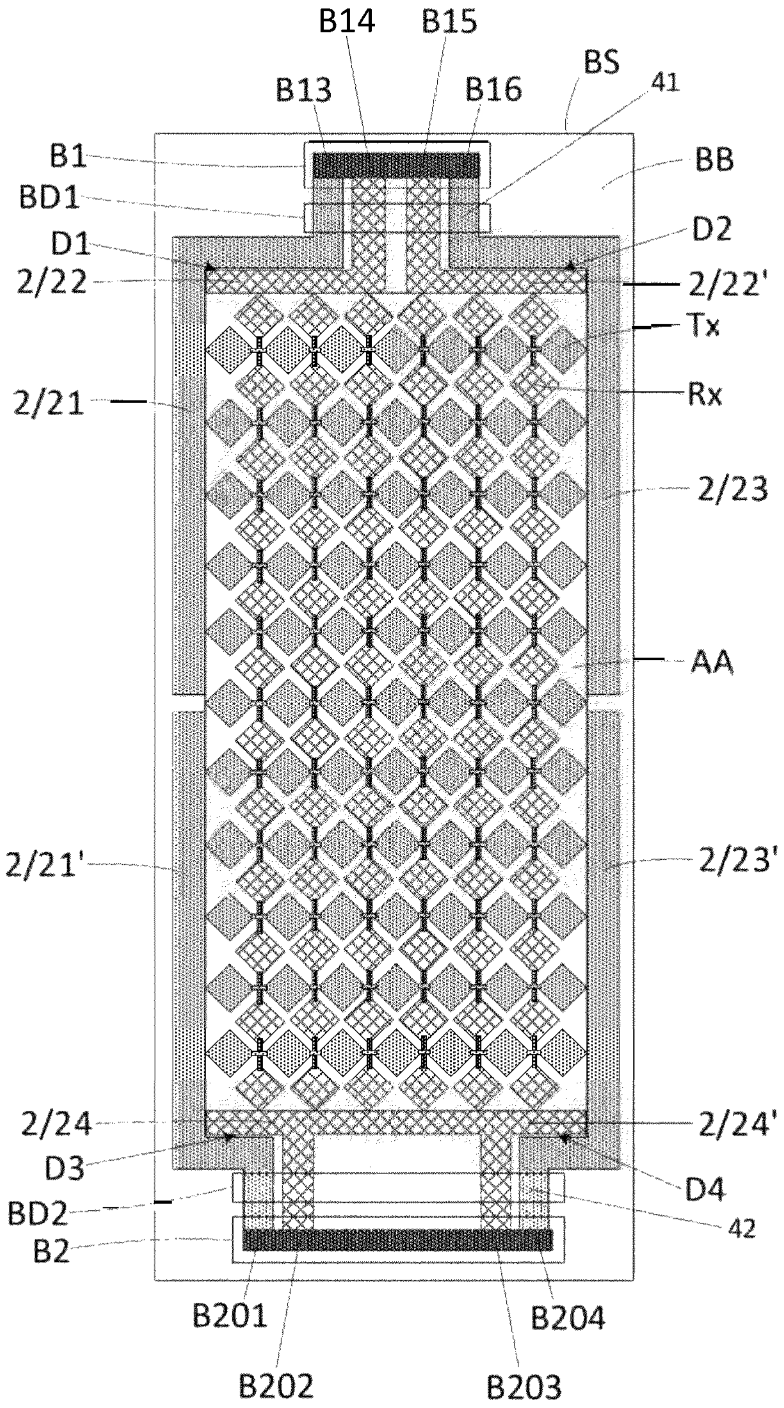
FIG. 22 is another schematic diagram of a touch control display panel in some embodiments according to the present disclosure.
Figure 23:
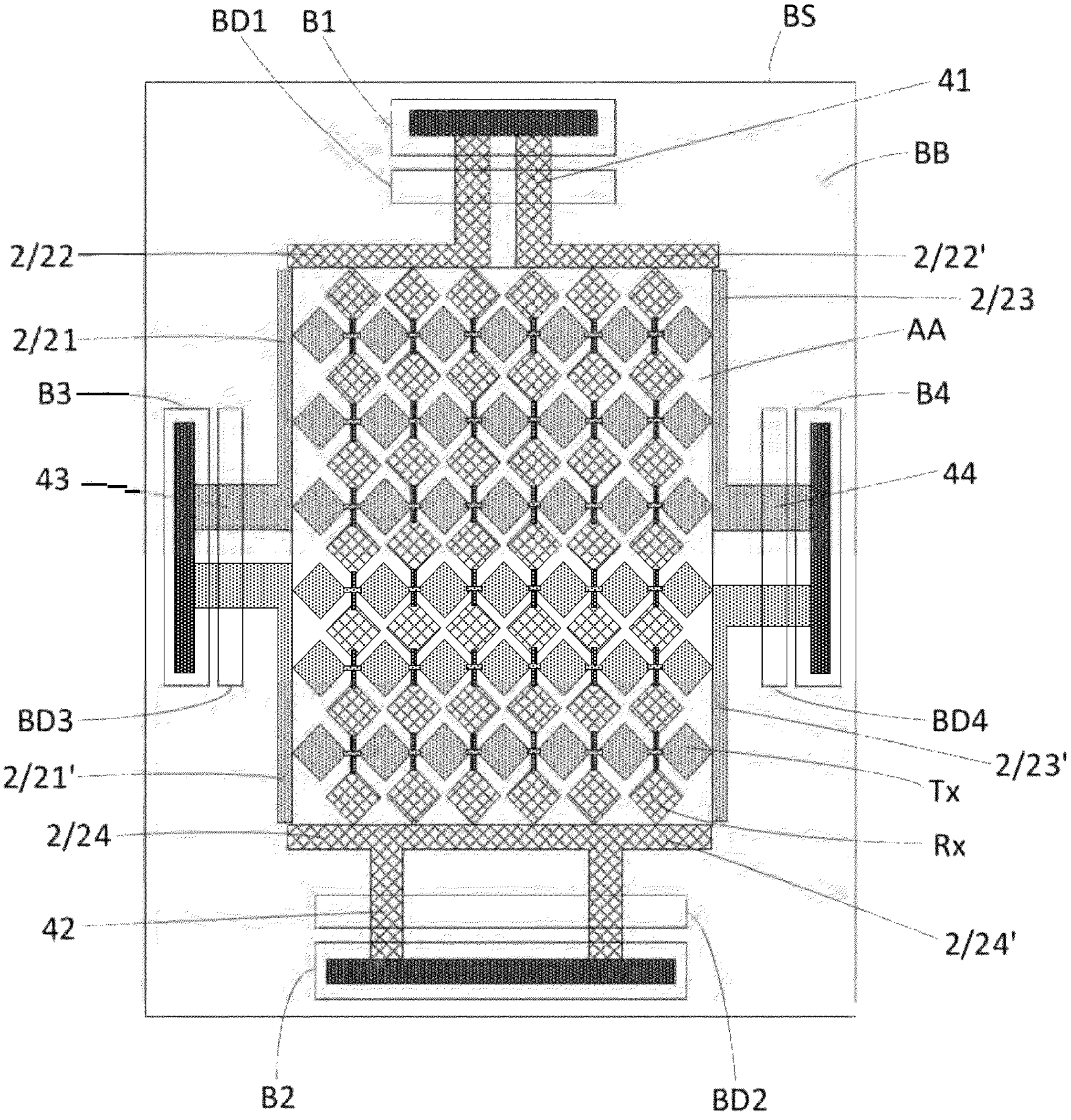
FIG. 23 is another schematic diagram of a touch control display panel in some embodiments according to the present disclosure.

Given this, in order to reduce the attenuation of the active pen signal and improve the performance indicators of the active pen, the present embodiment provides a touch control display panel. FIG. 19 is a schematic diagram of the structure of a touch control display panel in some embodiments according to the present disclosure. FIG. 20 is another schematic diagram of a touch control display panel in some embodiments according to the present disclosure, FIG. 21 is another schematic diagram of a touch control display panel in some embodiments according to the present disclosure. FIG. 22 is another schematic diagram of a touch control display panel in some embodiments according to the present disclosure. FIG. 23 is another schematic diagram of a touch control display panel in some embodiments according to the present disclosure. As shown in FIGS. 19 to 23. The touch control display panel includes a touch display area AA and the peripheral area BB around the touch display area AA. The peripheral area BB comprises the first binding region B1 and the second binding region B2 located on opposite sides of the touch display area AA, the first bending region BD1 between the first binding region B1 and the touch display area AA, and the second bending region BD2 between the second binding region B2 and the touch display area AA.

The touch control display panel in some embodiments further includes a base substrate BS; a touch electrode layer on the base substrate BS and in the touch display area AA. The touch electrode layer comprises multiple touch electrodes (Tx and Rx) that are arranged in the same layer and insulated from each other; multiple touch leads 2 on the base substrate BS, each touch lead 2 electrically connected to a corresponding touch electrode (Tx or Rx). In some embodiments, a portion of the touch leads 2 extends from the touch display area AA, passing through the first bending region BD1 to the first binding region B1. This portion of the touch leads 2 bends at the first bending region BD1 towards the back of the touch control display panel. Another portion of the touch leads 2 extends from the touch display area AA, passing through the second bending region BD2 to the second binding region B2. This other portion of the touch leads 2 bends at the second bending region BD2 towards the back of the touch control display panel. FIG. 19 to FIG. 23 illustrate the structure of the touch control display panel before bending.

The touch control display panel according to the present disclosure routes a portion of the touch leads to the first binding region and another portion of the touch leads to the second binding region. Since the first binding region and the second binding region are located on opposite sides of the touch display area, the routing of the touch leads extends from the touch electrodes to the binding regions on the two opposite sides of the touch control display panel. This configuration reduces the RC loading of the touch leads, thereby reducing the attenuation of the active pen signal and improving the signal-to-noise ratio of the active pen, thus achieving better performance indicators for the active pen.

In some embodiments, as shown in FIG. 19 to FIG. 22, multiple touch electrodes include multiple horizontally and vertically intersecting first touch electrodes Tx and second touch electrodes Rx. Multiple touch leads 2 include first leads (21 and 21') and second leads (22 and 22'). The first binding region B1 and the second binding region B2 are located at the respective ends of the extension direction of the second touch electrode Rx.

Each of the first leads (21 and 21') is electrically connected to a corresponding first end of a first touch electrode Tx. A portion of the first lead 21 extends from the touch display area AA, passing through the first bending region BD1 to the first binding region B1. Another portion of the first lead 21' extends from the touch display area AA, passing through the second bending region BD2 to the second binding region B2. By adopting dual-sided routing for the first leads (21 and 21'), the RC loading of the first leads (21 and 21') is reduced, thereby decreasing the attenuation of the active pen signal and improving the signal-to-noise ratio of the active pen, thus achieving better performance indicators for the active pen.

Each of the second leads (22 and 22') is electrically connected to a corresponding first end of a second touch electrode Rx. The second leads (22 and 22') extend from the touch display area AA, passing through the adjacent first bending region BD1 to the first binding region B1.

In some embodiments, as shown in FIG. 19 to FIG. 22, multiple touch leads 2 also include third leads (23 and 23') and fourth leads (24 and 24'). Each of the third leads (23 and 23') is electrically connected to a corresponding second end of a first touch electrode Tx. A portion of the third lead 23 extends from the touch display area AA, passing through the first bending region BD1 to the first binding region B1. Another portion of the third lead 23' extends from the touch display area AA, passing through the second bending region BD2 to the second binding region B2.

In this way, each first touch electrode Tx is equipped with dual-end leads, allowing simultaneous loading of touch signals from both the first and second ends of the first touch electrode Tx during touch signal acquisition. This improves the uniformity of touch signals and enhances touch performance. Additionally, the third leads (23 and 23') are also dual-sided, which reduces the RC loading of the third leads (23 and 23') and further reduces the attenuation of the active pen signal, improves the signal-to-noise ratio of the active pen, and achieves better performance indicators for the active pen.

Each of the fourth leads (24 and 24') is electrically connected to a corresponding second end of a second touch electrode Rx. The fourth leads (24 and 24') extend from the touch display area AA, passing through the adjacent second bending region BD2 to the second binding region B2.

In this manner, each second touch electrode Rx is equipped with dual-end leads, allowing simultaneous loading of touch signals from both the first and second ends of the second touch electrode Rx during touch signal acquisition. This further enhances the uniformity of touch signals and improves touch performance.

Furthermore, the second leads (22 and 22') and fourth leads (24 and 24') connected to the second touch electrode Rx are respectively routed to the adjacent binding region, thereby reducing the RC loading of the second leads (22 and 22') and fourth leads (24 and 24'). This further decreases the attenuation of the active pen signal, improves the signal-to-noise ratio of the active pen, and achieves better performance indicators for the active pen.

In some embodiments, referring to FIG. 19 and FIG. 20, the first binding region B1 includes independently positioned first sub-binding region B11 and second sub-binding region B12. The first sub-binding region B11 is located near the first end of the first touch electrode Tx, while the second sub-binding region B12 is located near the second end of the first touch electrode Tx.

In some embodiments, a portion of the first lead (21) extends from the touch display area AA, passing through the first bending region BD1 to the side of the first sub-binding region B11 near the first end of the first touch electrode Tx. In some embodiments, a portion of the third lead (23) extends from the touch display area AA, passing through the first bending region BD1 to the side of the second sub-binding region B12 near the second end of the first touch electrode Tx.

In some embodiments, a portion of the second lead (22) extends from the touch display area AA, passing through the first bending region BD1 to the side of the first sub-binding region B11 away from the first end of the first touch electrode Tx. Another portion of the second lead (22') extends from the touch display area AA, passing through the first bending region BD1 to the side of the second sub-binding region B12 away from the second end of the first touch electrode Tx. By extending a portion of the first lead (21) and a portion of the second lead (22) to the adjacent first sub-binding region B11, and extending a portion of the third lead (23) and another portion of the second lead (22') to the adjacent second sub-binding region B12, it is possible to further reduce the RC loading of the first lead (21), the second leads (22 and 22'), and the third lead (23). This further reduces the attenuation of the active pen signal, improves the signal-to-noise ratio of the active pen, and achieves the performance indicators of the active pen.

In some embodiments, referring to FIG. 19, the second binding region B2 includes independently set third sub-binding region B21 and fourth sub-binding region B22. The third sub-binding region B21 is located near the first end of the first touch electrode Tx, while the fourth sub-binding region B22 is located near the second end of the first touch electrode Tx.

In some embodiments, the other portion of the first lead (21') extends from the touch display area AA through the second bending region BD2 to the third sub-binding region B21, located on the side near the first end of the first touch electrode Tx. Similarly, the other portion of the third lead (23') extends from the touch display area AA through the second bending region BD2 to the fourth sub-binding region B22, located on the side near the second end of the first touch electrode Tx.

In some embodiments, one portion of the fourth lead (24) extends from the touch display area AA through the second bending region BD2 to the third sub-binding region B21, located on the side away from the first end of the first touch electrode Tx. In some embodiments, the other portion of the fourth lead (24') extends from the touch display area AA through the second bending region BD2 to the fourth sub-binding region B22, located on the side away from the second end of the first touch electrode Tx. By routing portion of the first lead (21') and portion of the fourth lead (24) to the adjacent third sub-binding region B21, and routing portion of the third lead (23') and portion of the fourth lead (24') to the adjacent fourth sub-binding region B22, it is possible to further reduce the RC loading of the first lead (21'); the fourth lead (24 and 24'), and the third lead (23'). This further reduces the attenuation of the active pen signal, improves the signal-to-noise ratio of the active pen, and achieves the performance indicators of the active pen.

In some embodiments, referring to FIG. 20, the second binding region B2 includes sequentially arranged and independently set fifth sub-binding region B23, sixth sub-binding region B24, seventh sub-binding region B25, and eighth sub-binding region B26 along the extension direction of the first touch electrode Tx.

In some embodiments, another portion of the first lead 21' extends from the touch display region AA, passes through the second bending region BD2, and reaches the fifth sub-binding region B23, located on the side near the first end of the first touch electrode Tx. Similarly, another portion of the third lead 23' extends from the touch display region AA, passes through the second bending region BD2, and reaches the eighth sub-binding region B26, located on the side near the second end of the first touch electrode Tx.

In some embodiments, the fourth lead (24 and 24') is grouped into four groups. namely a first group of fourth leads 241, a second group of fourth leads 242, a third group of fourth leads 243, and a fourth group of fourth leads 244, along the extension direction of the first touch electrode Tx. The first group of fourth leads 241 extends from the touch display region AA, passes through the second bending region BD2, and reaches the fifth sub-binding region B23, located on the side away from the first end of the first touch electrode Tx. The second group of fourth leads 242 extends from the touch display region AA, passes through the second bending region BD2, and reaches the sixth sub-binding region B24, located on the side near the first end of the first touch electrode Tx. The third group of fourth leads 243 extends from the touch display region AA, passes through the second bending region BD2, and reaches the seventh sub-binding region B25, located on the side near the second end of the first touch electrode Tx. The fourth group of fourth leads 244 extends from the touch display region AA, passes through the second bending region BD2, and reaches the eighth sub-binding region B26, located on the side away from the second end of the first touch electrode Tx. By setting the second binding region B2 to include four sub-binding regions and dividing the fourth leads (24 and 24') into four groups, each group of fourth leads is brought out to its adjacent sub-binding region. This further reduces the RC loading of the fourth leads (24 and 24'), thereby further reducing the signal attenuation of the active pen, improving the signal-to-noise ratio of the active pen, and achieving the performance indicators of the active pen.

In some embodiments, referring to FIG. 21 and FIG. 22, the first binding region B1 is located in the central area of the peripheral region BB on one side of the first end of the second touch electrode Rx. The first binding region B1 is divided along the extension direction of the first touch electrode Tx into sequentially arranged sub-regions, namely the first sub-region B13, the second sub-region B14, the third sub-region B15, and the fourth sub-region B16. The first sub-region B13 is located near the first end of the first touch electrode Tx.

In some embodiments, a portion of the first lead 21 extends from the touch display region AA, passes through the first bending region BD1, and reaches the first sub-region B13. Another portion of the third lead 23 extends from the touch display region AA, passes through the first bending region BD1, and reaches the fourth sub-region B16.

In some embodiments, a portion of the second lead 22 extends from the touch display region AA, passes through the first bending region BD1, and reaches the second sub-region B14. Another portion of the second lead 22' extends from the touch display region AA, passes through the first bending region BD1, and reaches the third sub-region B15. By dividing the first binding region B1 into four sub-regions and routing a portion of the first lead 21, a portion of the third lead 23, a portion of the second lead 22, and another portion of the second lead 22' to their respective adjacent regions, it is possible to further reduce the RC loading of the first lead 21, the third lead 23, and the second lead (22 and 22'). This further reduces the attenuation of the active pen signal, improves the signal-to-noise ratio of the active pen, and achieves the performance objectives of the active pen.

In some embodiments, referring to FIG. 21, the second binding region B2 in the provided touch control display panel includes sequentially arranged and independently set the ninth sub-region B27, the tenth sub-region B28, the eleventh sub-region B29, and the twelfth sub-region B20 along the extension direction of the first touch electrode Tx.

In some embodiments, another portion of the first lead 21' extends from the touch display region AA through the second bending region BD2 to the ninth sub-region B27 located on the side near the first end of the first touch electrode Tx. Another portion of the third lead 23' extends from the touch display region AA through the second bending region BD2 to the twelfth sub-region B20 located on the side near the second end of the first touch electrode Tx.

In some embodiments, the fourth lead (24 and 24') along the extension direction of the first touch electrode Tx is divided into the fifth group of fourth leads 245, the sixth group of fourth leads 246, the seventh group of fourth leads 247, and the eighth group of fourth leads 248. The fifth group of fourth lead 245 extends from the touch display region AA through the second bending region BD2 to the ninth sub-region B27, located on the side away from the first end of the first touch electrode Tx. The sixth group of fourth lead 246 extends from the touch display region AA through the second bending region BD2 to the tenth sub-region B28, located on the side near the first end of the first touch electrode Tx. The seventh group of fourth lead 247 extends from the touch display region AA through the second bending region BD2 to the eleventh sub-region B29, located on the side near the second end of the first touch electrode Tx. The eighth group of fourth lead 248 extends from the touch display region AA through the second bending region BD2 to the twelfth sub-region B20, located on the side away from the second end of the first touch electrode Tx. By setting the second binding region B2 to include four sub-regions and dividing the fourth lead (24 and 24') into four groups of leads, and routing each group of fourth leads to the adjacent sub-binding region, the RC loading of the fourth lead (24 and 24') can be further reduced. This further reduces the signal attenuation of the active pen and improves its signal-to-noise ratio, thus achieving the performance indicators of the active pen.

In some embodiments, referring to FIG. 22, the second binding region B2 is located in the central area of the peripheral region BB on the side of the second end of the second touch electrode Rx. The second binding region B2 is divided along the extension direction of the first touch electrode Tx into the sequentially arranged fifth region B201, sixth region B202, seventh region B203, and eighth region B204. The fifth region B201 is close to the first end of the first touch electrode Tx.

In some embodiments, one portion of the first lead 21' extends from the touch display area AA, passes through the second bending region BD2, and reaches the fifth region B201. Another portion of the third lead 23' extends from the touch display area AA, passes through the second bending region BD2, and reaches the eighth region B204.

In some embodiments, one portion of the fourth lead 24 extends from the touch display area AA, passes through the second bending region BD2, and reaches the sixth region B202, Another portion of the fourth lead 24' extends from the touch display area AA, passes through the second bending region BD2, and reaches the seventh region B203. By dividing the second binding region B2 into four regions and routing the respective portions of the first lead 21', the third lead 23', a portion of the fourth lead 24, and another portion of the fourth lead 24' to their adjacent regions, it is possible to further reduce the RC loading of the first lead 21', the third lead 23', and the fourth lead (24 and 24'). This, in turn, reduces signal attenuation in the active pen, improves its signal-to-noise ratio, and achieves the performance goals of the active pen.

Figure 24A:
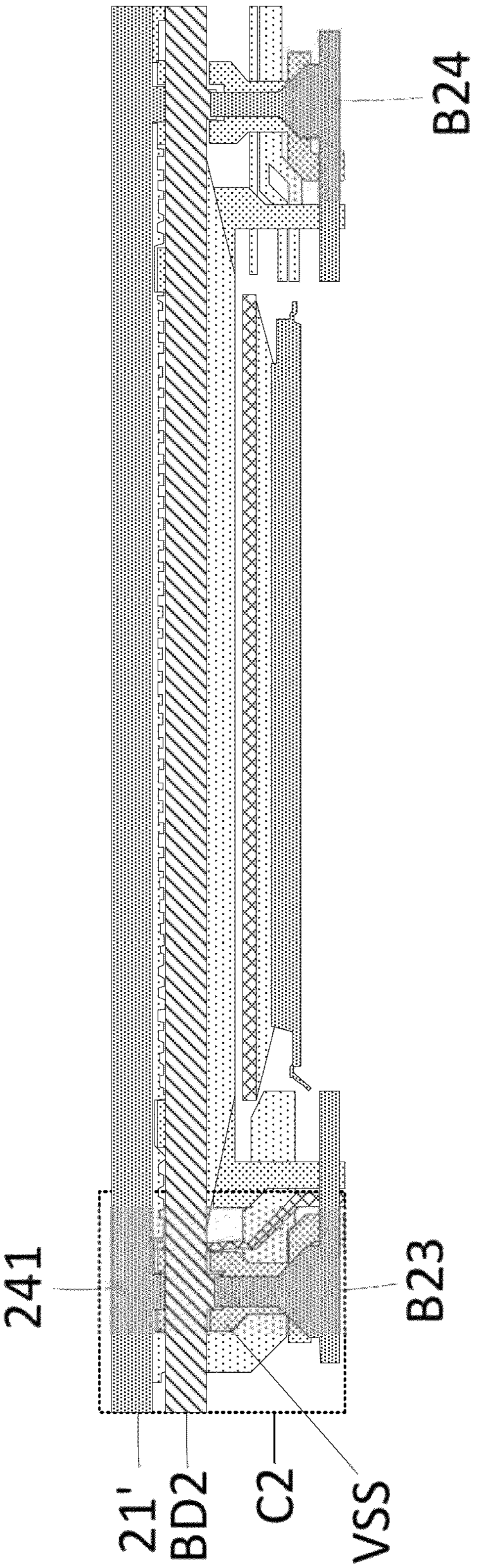
FIG. 24A is an enlarged schematic diagram of the dashed box C1 within FIG. 20.
Figure 24B:
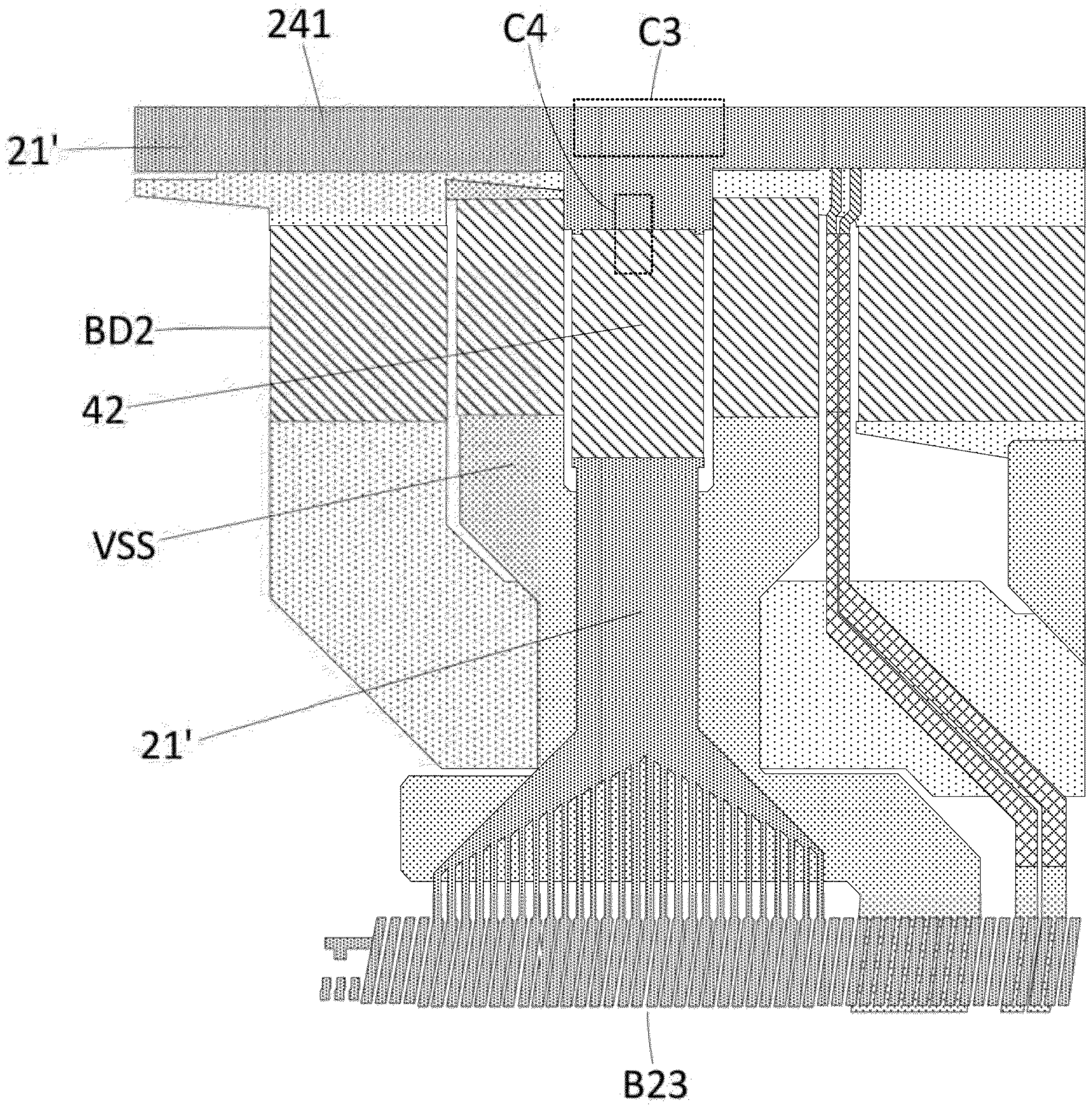
FIG. 24B is an enlarged schematic diagram of the dashed box C2 within FIG. 24A.
Figure 24C:
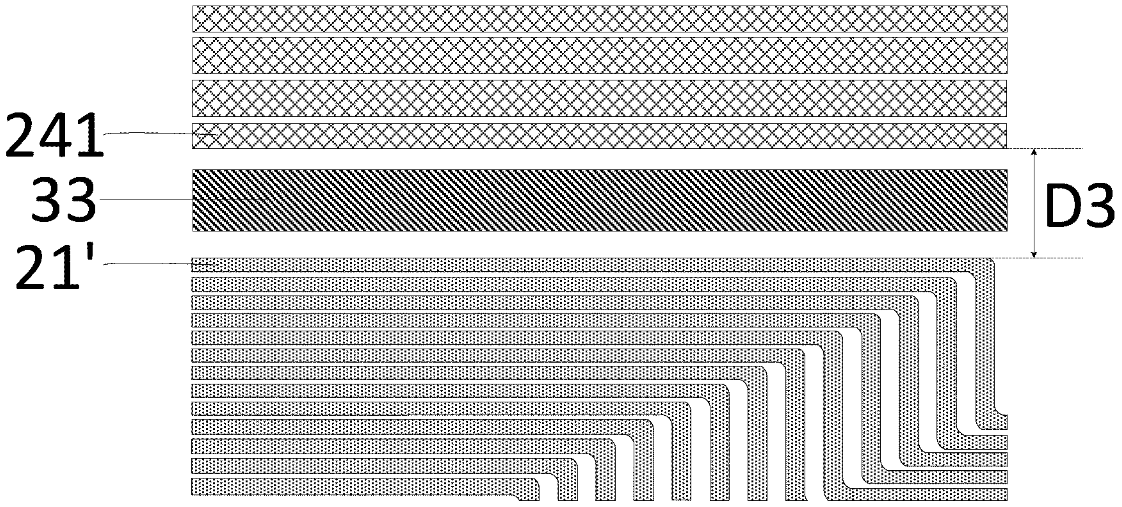
FIG. 24C is an enlarged schematic diagram of the dashed box C3 within FIG. 24B.
Figure 24D:
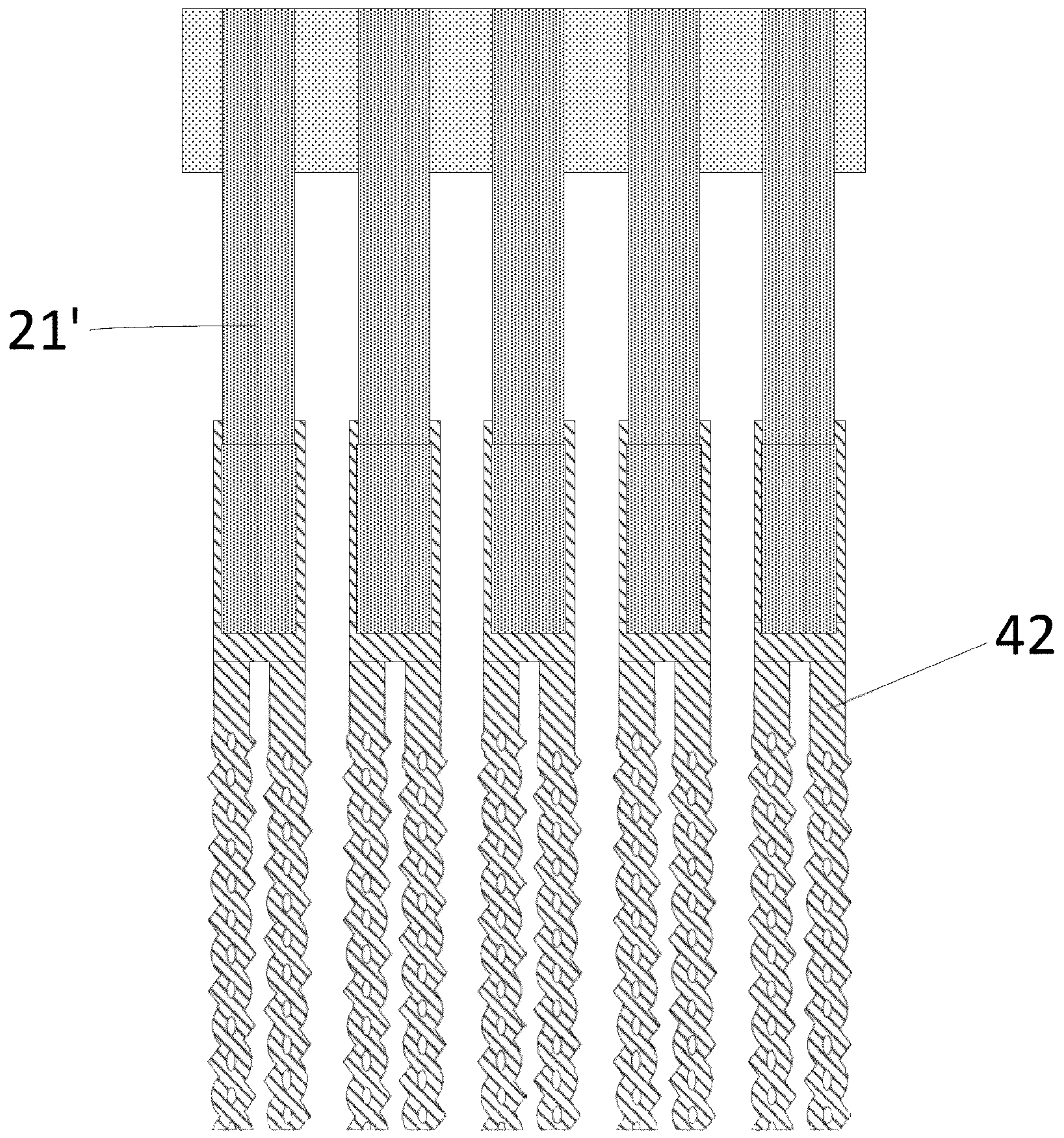
FIG. 24D is an enlarged schematic diagram of the dashed box C4 within FIG. 24B.
Figure 24E:
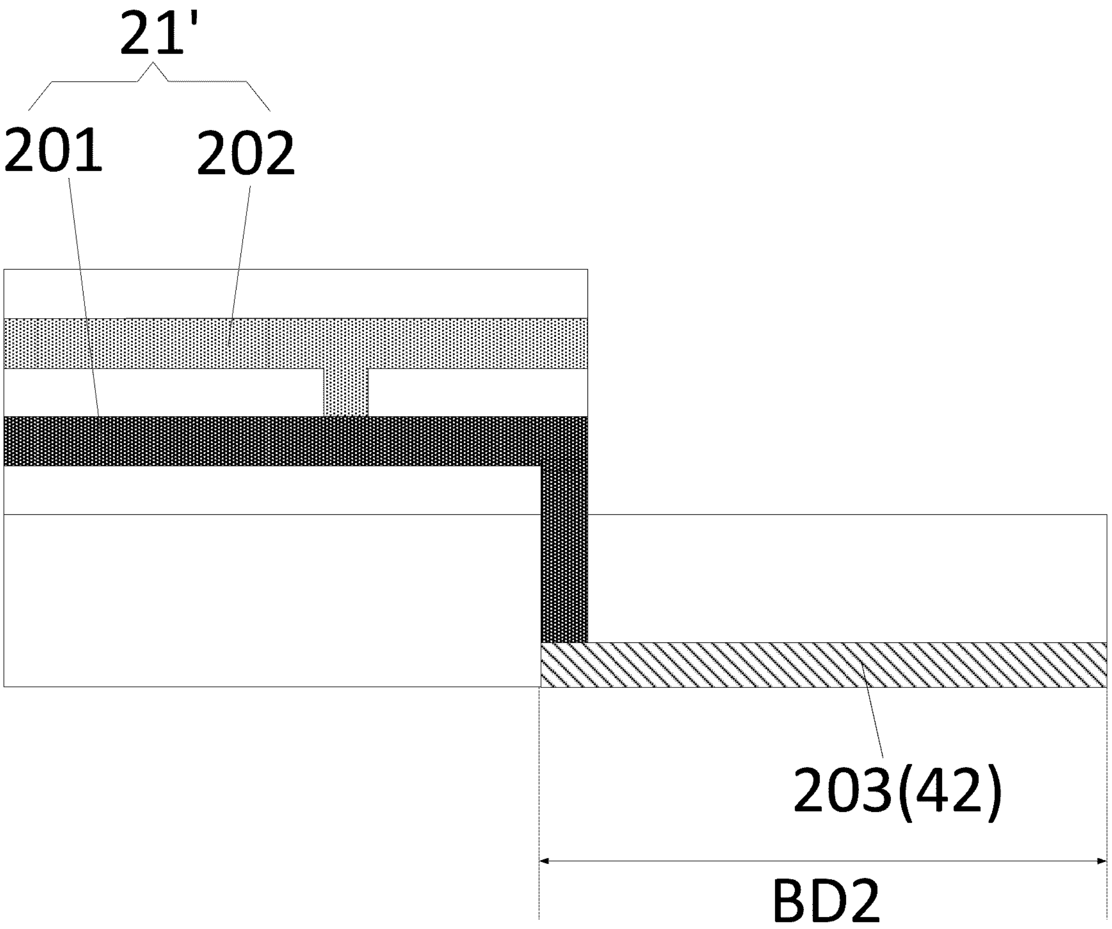
FIG. 24E is a cross-sectional schematic diagram of the dashed box C4 within FIG. 24B.
Figure 25A:
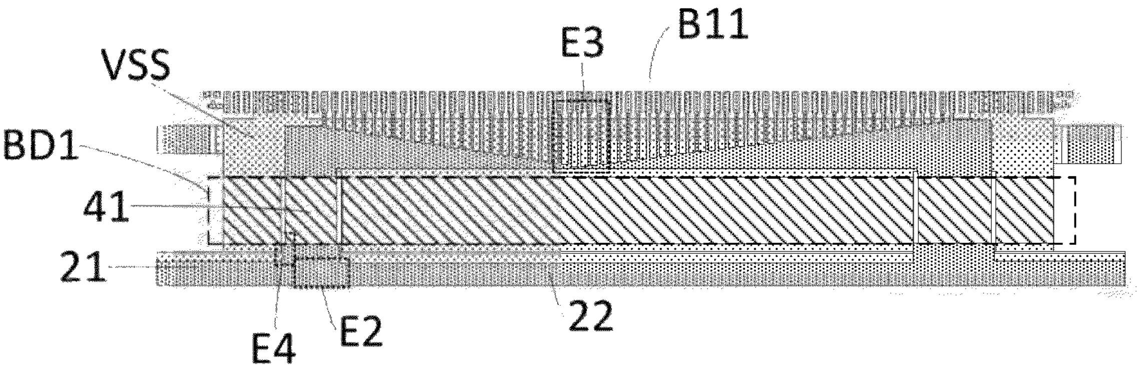
FIG. 25A is an enlarged schematic diagram of the dashed box E1 within FIG. 20.
Figure 25B:
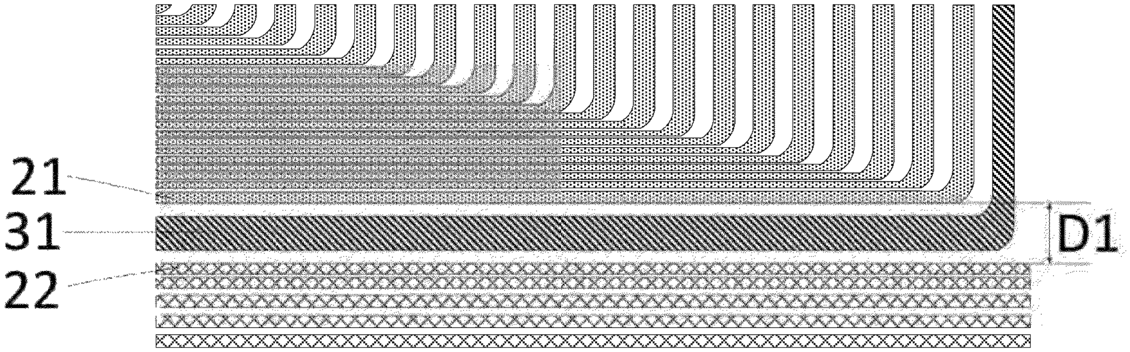
FIG. 25B is an enlarged schematic diagram of the dashed box E2 within FIG. 25A.
Figure 25C:
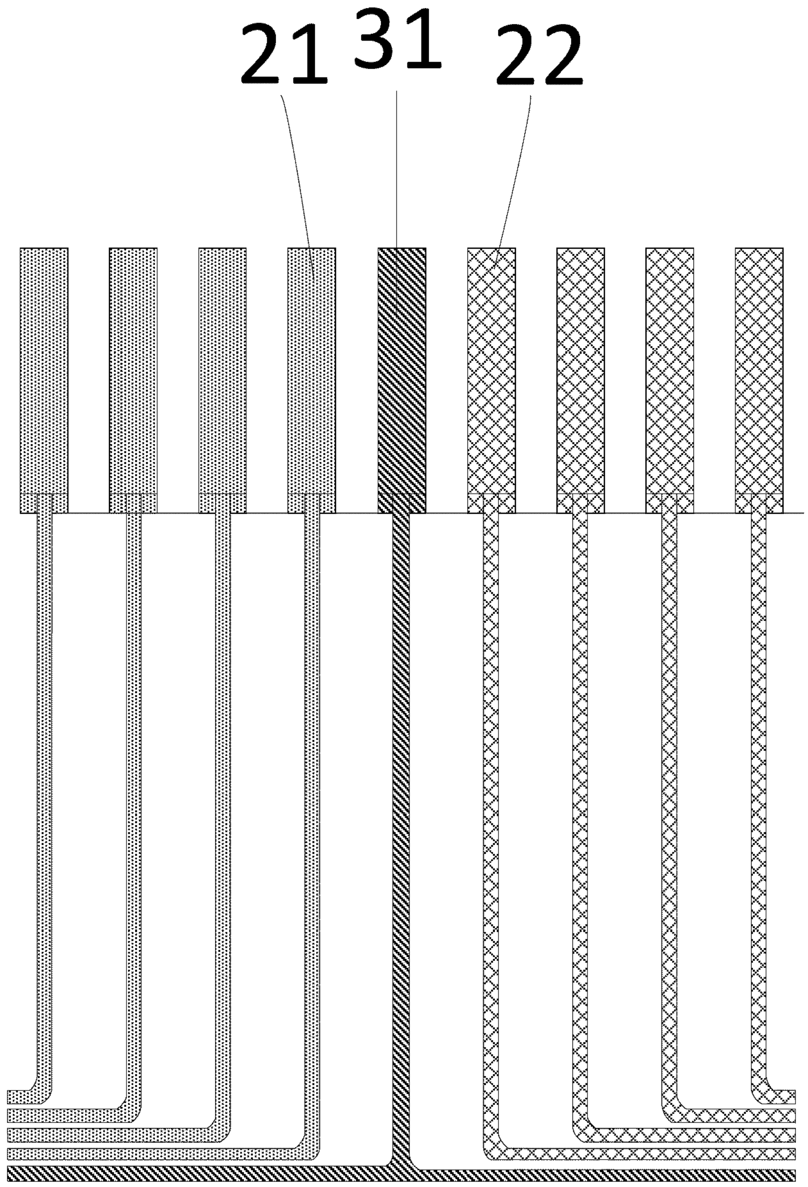
FIG. 25C is an enlarged schematic diagram of the dashed box E3 within FIG. 25B.
Figure 25D:
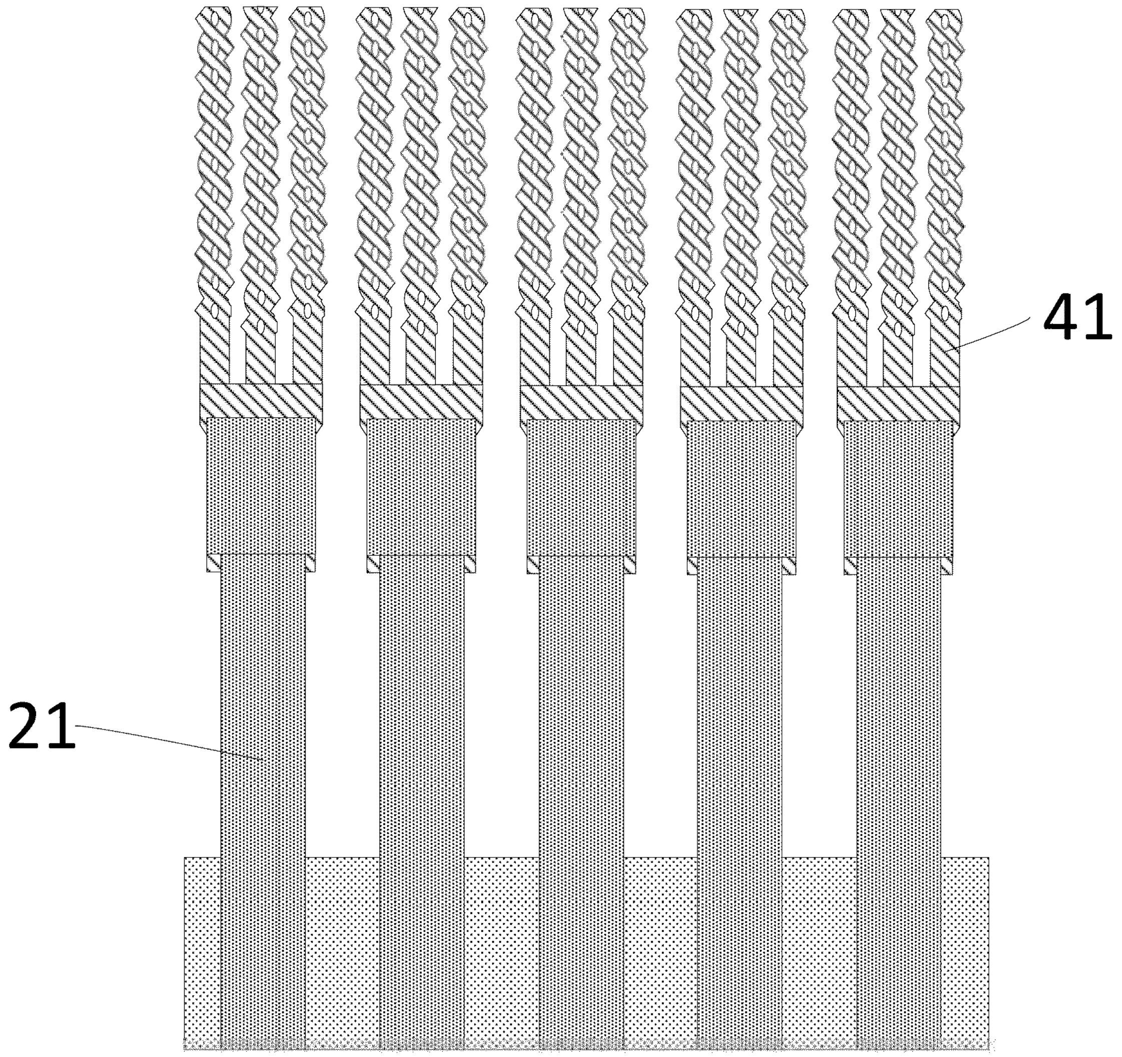
FIG. 25D is an enlarged schematic diagram of the dashed box E4 within FIG. 25B.

FIG. 24A represents an enlarged schematic diagram within the dashed box C1 in FIG. 20, FIG. 24B represents an enlarged schematic diagram within the dashed box C2 in FIG. 24A. FIG. 24C represents an enlarged schematic diagram within the dashed box C3 in FIG. 24B, FIG. 24D represents an enlarged schematic diagram within the dashed box C4 in FIG. 24B, and FIG. 24E represents a cross-sectional schematic diagram of a portion of the film layer in the direction from the second bending region BD2 to the second binding region B2 within the dashed box C4 in FIG. 24B. Furthermore, FIG. 25A represents an enlarged schematic diagram within the dashed box E1 in FIG. 20, FIG. 25B represents an enlarged schematic diagram within the dashed box E2 in FIG. 25A, FIG. 25C represents an enlarged schematic diagram within the dashed box E3 in FIG. 25B, and FIG. 25D represents an enlarged schematic diagram within the dashed box E4 in FIG. 25B. The gap between the first lead 21, electrically connected to the first touch electrode Tx closest to the first end of the second touch electrode Rx, and the second lead 22, electrically connected to the second touch electrode Rx closest to the first end of the first touch electrode Tx, is referred to as the first gap D1. The width of the first gap D1 is greater than or equal to 70 μm. This configuration helps reduce signal interference between the first lead 21 and the second lead 22, enhances the signal stability of the touch control display panel, improves the signal stability in the working environment of the active pen, and thereby enhances key performance parameters such as signal-to-noise ratio (SNR) and linearity.

In some embodiments, the gap between the third lead 23, electrically connected to the first touch electrode Tx closest to the first end of the second touch electrode Rx, and the second lead 22', electrically connected to the second touch electrode Rx closest to the second end of the first touch electrode Tx, which is closest to the first end of the second touch electrode Rx, is referred to as the second gap D2. The width of the second gap D2 is greater than or equal to 70 μm. This configuration helps reduce signal interference between the third lead 23 and the second lead 22', enhances the signal stability of the touch control display panel, improves the signal stability in the working environment of the active pen, and thereby enhances key performance parameters such as signal-to-noise ratio (SNR) and linearity.

In some embodiments, the gap between the first lead 21', electrically connected to the first touch electrode Tx closest to the second end of the second touch electrode Rx, and the fourth lead 24, electrically connected to the second touch electrode Rx closest to the first end of the first touch electrode Tx, which is closest to the second end of the second touch electrode Rx, is referred to as the third gap D3. The width of the third gap D3 is greater than or equal to 70 μm. This configuration helps reduce signal interference between the first lead 21' and the fourth lead 24, enhances the signal stability of the touch control display panel, improves the signal stability in the working environment of the active pen, and thereby enhances key performance parameters such as signal-to-noise ratio (SNR) and linearity.

In some embodiments, the gap between the third lead 23', electrically connected to the first touch electrode Tx closest to the second end of the second touch electrode Rx, and the fourth lead 24', electrically connected to the second touch electrode Rx closest to the second end of the first touch electrode Tx, which is closest to the second end of the second touch electrode Rx, is referred to as the fourth gap D4. The width of the fourth gap D4 is greater than or equal to 70 μm. This configuration helps reduce signal interference between the third lead 23' and the fourth lead 24', enhances the signal stability of the touch control display panel, improves the signal stability in the working environment of the active pen, and thereby enhances key performance parameters such as signal-to-noise ratio (SNR) and linearity.

In some embodiments, referring to FIG. 20, FIG. 25B, and FIG. 25C, a first shield line 31 is positioned within the first gap D1, The first shield line 31 is grounded and can also carry a constant voltage signal. When the first shield line 31 carries a constant voltage signal or is grounded, it effectively shields the mutual interference between the signals of the first lead 21 and the second lead 22, ensuring the stability of the signals between the first lead 21 and the second lead 22.

In some embodiments, referring to FIG. 20 and FIG. 24C, a third shield line 33 is positioned within the third gap D3. The third shield line 33 can be grounded and can also carry a constant voltage signal. When the third shield line 33 carries a constant voltage signal or is grounded, it effectively shields the mutual interference between the signals of the first lead 21' and the fourth lead 24 within the third gap D3, ensuring the stability of the signals between the first lead 21' and the fourth lead 24.

In some embodiments, referring to FIG. 20, a second shield line (not shown) is positioned within the second gap D2. The second shield line is grounded and can also carry a constant voltage signal. When the second shield line carries a constant voltage signal or is grounded, it effectively shields the mutual interference between the signals of the second lead 22' and the third lead 23, ensuring the stability of the signals between the second lead 22' and the third lead 23.

In some embodiments, within the fourth gap D4, a fourth shield line (not shown) is positioned. The fourth shield line is grounded and can also carry a constant voltage signal. When the fourth shield line carries a constant voltage signal or is grounded, it effectively shields the mutual interference between the signals of the third lead 23' and the fourth lead 24', ensuring the stability of the signals between the third lead 23' and the fourth lead 24'.

In some embodiments, referring to FIG. 19, FIG. 21, and FIG. 22, a first shield line (not shown) is positioned within the first gap D1, and the first shield line is grounded. Within the second gap D2, a second shield line (not shown) is positioned, and the second shield line is also grounded. Similarly, within the third gap D3, a third shield line (not shown) is positioned, and the third shield line is grounded. Lastly, within the fourth gap D4, a fourth shield line (not shown) is positioned, and the fourth shield line is grounded.

In some embodiments, referring to FIG. 20, FIG. 25A, and FIG. 25C, the left side of the first sub-binding region B11 corresponds to the area bound by the first lead 21, while the right side of the first sub-binding region B11 corresponds to the area bound by the second lead 22. The area between the rightmost first lead 21 and the leftmost second lead 22 in the first sub-binding region B11 is the binding area corresponding to the first shield line 31. The first shield line 31 extends downward from the middle area of the first sub-binding region B11 and branches out. One branch surrounds the rightmost first lead 21 and extends to the left, reaching the left end of the first gap D1. The other branch surrounds the leftmost second lead 22 and extends to the right, reaching the right end of the first gap D1. This arrangement ensures that the first shield line 31 completely isolates the first lead 21 and the second lead 22, avoiding mutual interference.

In alternative embodiments, the second shield line, third shield line, and fourth shield line can adopt a similar routing method as the first shield line described above.

In some embodiments, referring to FIG. 19 to FIG. 22, a portion of the first lead 21 crosses over to the first binding region B1 in the first bending region BD1, while another portion of the first lead 21' crosses over to the second binding region B2 in the second bending region BD2.

In some embodiments, a portion of the third lead 23 crosses over to the first binding region B1 in the first bending region BD1, while another portion of the third lead 23' crosses over to the second binding region B2 in the second bending region BD2.

In some embodiments, the second lead (22 and 22') crosses over to the first binding region B1 in the first bending region BD1, and the fourth lead (24 and 24") crosses over to the second binding region B2 in the second bending region BD2. After the touch control display panel is bound to the flexible printed circuit (FPC), both the first binding region B1 and the second binding region B2 can be bent to the back of the display panel, achieving a narrow bezel design.

In some embodiments, referring to FIG. 19 to FIG. 22, FIG. 24D, and FIG. 25D, the first bending region BD1 includes multiple first crossover lines 41 arranged in sequence along the extension direction of the first touch electrode Tx. The second bending region BD2 includes multiple second crossover lines 42 arranged in sequence along the extension direction of the first touch electrode Tx.

In some embodiments, due to the ample wiring space in the upper border of the touch control display panel and the limited space in the lower border, the number of second crossover lines 42 electrically connected to a touch lead 2 extending to the second binding region B2 can be less than the number of first crossover lines 41 electrically connected to a touch lead 2 extending to the first binding region B1.

In some embodiments, referring to FIG. 19 to FIG. 22, FIG. 24D, and FIG. 25D, one of the first leads 21 in a portion of the first leads 21 is electrically connected to at least three corresponding first crossover lines 41. This can increase the width of the first lead 21, reduce its impedance, and ensure that when one of the first crossover lines 41 breaks due to bending or other processes, the first lead 21 remains electrically connected to the other unbroken first crossover lines 41, thereby enhancing the touch signal.

In some embodiments, one of the third leads 23 in a portion of the third leads 23 is electrically connected to at least three corresponding first crossover lines 41. This increases the width of the third lead 23, reduces its impedance, and ensures that when one of the first crossover lines 41 breaks, the third lead 23 remains electrically connected to the other unbroken first crossover lines 41, thereby enhancing the touch signal.

In some embodiments, one of the second leads (22 and 22') is electrically connected to at least three corresponding first crossover lines 41. This increases the width of the second leads (22 and 22'), reduces their impedance, and ensures that when one of the first crossover lines 41 breaks, the second leads (22 and 22') remain electrically connected to the other unbroken first crossover lines 41, thereby enhancing the touch signal.

In some embodiments, in another portion of the first leads 21', one of the first leads. 21' can be electrically connected to at least two (e.g., two) corresponding second crossover lines 42. This increases the width of the first lead 21', reduces its impedance, and ensures that when one of the second crossover lines 42 breaks, the first lead 21' remains electrically connected to the other unbroken second crossover lines 42, thereby enhancing the touch signal.

In some embodiments, one of the third leads 23' in another portion of the third leads 23' can be electrically connected to at least two corresponding second crossover lines 42, This increases the width of the third lead 23', reduces its impedance, and ensures that when one of the second crossover lines 42 breaks, the third lead 23' remains electrically connected to the other unbroken second crossover lines 42, thereby enhancing the touch signal.

In some embodiments, one of the fourth leads (24 and 24') can be electrically connected to at least two corresponding second crossover lines 42. This increases the width of the fourth leads (24 and 24'), reduces their impedance, and ensures that when one of the second crossover lines 42 breaks, the fourth leads (24 and 24') remain electrically connected to the other unbroken second crossover lines 42, thereby enhancing the touch signal.

It should be noted that the structure of the touch electrodes in this disclosed embodiment is the same as the structure shown in FIG. 17 and FIG. 18. The difference between this disclosed embodiment and FIG. 18 lies in the routing method of the touch leads.

In some embodiments, referring to FIG. 17 to FIG. 22, and FIG. 24E, the touch structure 30 in FIG. 17 is a sectional diagram along the DD' direction in FIG. 18. The first touch electrode Tx is a unitary structure. The second touch electrode Rx includes multiple touch sub-electrodes Rx' spaced apart from each other by multiple connection portions LK. The touch control display panel further includes a first insulation layer 70 located between the touch sub-electrodes Rx' and the connection portions LK. The connection portions LK are close to the display panel 10, and each adjacent pair of touch sub-electrodes Rx' is electrically connected to the connection portions LK through vias that penetrate the first insulation layer 70.

In some embodiments, the touch control display panel includes a first source-drain metal layer SD1, a second insulation layer (not shown), and a second source-drain metal layer SD2 that are sequentially stacked between the substrate base 1 and the connection portions LK. The first source-drain metal layer is positioned close to the substrate base 1. In other words, the first source-drain metal layer SD1, second insulation layer, and second source-drain metal layer SD2 are located within the interior of the display panel 10 shown in FIG. 17.

In some embodiments, the touch leads 2 (21, 21', 22, 22', 23, 23', 24, 24') correspond to portions that include electrically connected first metal lines and second metal lines, excluding the first bending region BD1 and the second bending region BD2. For example, taking the first lead 21' as an example, the portion corresponding to the first lead 21' excluding the second bending region BD2 includes the electrically connected first metal line 201 and second metal line 202. The first metal line 201 can be arranged in the same layer as the connection portion LK shown in FIG. 17, and the second metal line 202 can be arranged in the same layer as the first touch electrode Tx. By adopting a dual-layer metal routing for the touch leads 2, the resistance of the touch leads 2 can be reduced, thereby improving signal transmission performance.

In some embodiments, in the touch leads 2 (21, 21', 22, 22', 23, 23', 24, 24'), the portions corresponding to the first bending region BD1 and the second bending region BD2 are the third metal lines located in the second source-drain metal layer SD2. For example, taking the first lead 21' as an example, the portion of the first lead 21' corresponding to the second bending region BD2 is the third metal line 203 (i.e., the second cross-connection line 42) located in the second source-drain metal layer SD2. The first metal line 201 and the third metal line 203 (42) are electrically connected through a via hole that penetrates the second source-drain metal layer SD2 and the second insulation layer (which may include some planar layers and passivation layers) between the second source-drain metal layer SD2 and the connection portion LK. Alternatively, it can also be the second metal line 202 and the third metal line 203 that are electrically connected through a via hole that penetrates the second source-drain metal layer and the third insulation layer (which may include some planar layers and passivation layers) between the second source-drain metal layer and the first touch electrode Tx. This configuration allows the first bending region BD1 and the second bending region BD2 to use only the second source-drain metal layer SD2, thereby improving bending performance.

In some embodiments, referring to FIG. 23, multiple touch electrodes include multiple horizontally and vertically intersecting first touch electrodes Tx and second touch electrodes Rx. The first binding region B1 and the second binding region B2 are located at the opposite ends of the extension direction of the second touch electrodes Rx.

In some embodiments, the peripheral region BB also includes the third binding region B3 and the fourth binding region B4, which are respectively located at the opposite ends of the extension direction of the first touch electrodes Tx. The peripheral region BB further includes the third bending region BD3 located between the third binding region B3 and the touch display region AA, as well as the fourth bending region BD4 located between the fourth binding region B4 and the touch display region AA.

In some embodiments, multiple touch leads 2 include the first leads (21 and 21') and the second leads (22 and 22'). Each first lead (21 and 21') is electrically connected to a corresponding first end of a first touch electrode Tx. The first leads (21 and 219) extend from the touch display region AA, passing through the adjacent third bending region BD3, and reaching the third binding region B3.

In some embodiments, each second lead (22 and 22') is electrically connected to a corresponding first end of a second touch electrode Rx. The second leads (22 and 22') extend from the touch display region AA, passing through the adjacent first bending region BD1, and reaching the first binding region B1. By routing the first leads (21 and 21') to the adjacent third binding region B3 and routing the second leads (22 and 22') to the adjacent first binding region B1, the RC loading of the first leads (21 and 21') and second leads (22 and 22') can be reduced. This reduces the attenuation of the active pen signal and improves the signal-to-noise ratio of the active pen, thereby achieving the performance objectives of the active pen.

In some embodiments, referring to FIG. 23, multiple touch leads (2) also include third leads (23 and 23') and fourth leads (24 and 24'). Each third lead (23 and 23') is electrically connected to a corresponding second end of a first touch electrode Tx. The third leads (23 and 23') extend from the touch display region AA, passing through the adjacent fourth bending region, and reaching the fourth binding region B4. This way, each first touch electrode Tx is equipped with dual-end leads. When loading touch signals, the touch signals can be simultaneously applied from the first and second ends of the first touch electrode Tx. This improves the uniformity of touch signals and enhances touch performance.

In some embodiments, each fourth lead (24 and 24') is electrically connected to a corresponding second end of a second touch electrode Rx. The fourth leads (24 and 24') extend from the touch display region AA, passing through the adjacent second bending region BD2, and reaching both ends of the second binding region B2. This way, each second touch electrode Rx is equipped with dual-end leads. When loading touch signals, the touch signals can be simultaneously applied from the first and second ends of the second touch electrode Rx. This further improves the uniformity of touch signals and enhances touch performance. Additionally, by extending the third leads (23 and 23') to the adjacent fourth binding region B4 and extending the second end of the fourth leads (24 and 24') to the adjacent second binding region B2, the RC loading of the third leads (23 and 23') and fourth leads (24 and 24') can be reduced. This reduces the attenuation of active pen signal quantity, improves the signal-to-noise ratio of the active pen, and achieves performance improvements for the active pen.

In some embodiments, referring to FIG. 23, the first leads (21 and 21') cross over to the third binding region B3 in the third bending region BD3, the second leads (22 and 22') cross over to the first binding region B1 in the first bending region BD1, the third leads (23 and 23') cross over to the fourth binding region B4 in the fourth bending region BD4, and the fourth leads (24 and 24') cross over to the second binding region B2 in the second bending region BD2. After the touch control display panel is bonded to the flexible printed circuit board (FPC), the first binding region B1, second binding region B2, third binding region B3, and fourth binding region B4 can all be bent to the back of the display panel, achieving a narrow bezel design.

In some embodiments, referring to FIG. 23, the first bending region BD1 includes multiple first crossover lines (41) arranged in sequence along the extension direction of the first touch electrode Tx. The second bending region BD2 includes multiple second crossover lines (42) arranged in sequence along the extension direction of the first touch electrode Tx. The third bending region BD3 includes multiple third crossover lines (43) arranged in sequence along the extension direction of the second touch electrode Rx. The fourth bending region BD4 includes multiple fourth crossover lines (44) arranged in sequence along the extension direction of the second touch electrode Rx.

In some embodiments, a first lead (21 and 21') is electrically connected to at least two corresponding third crossover lines (43). This increases the width of the first lead (21 and 21'), reduces its impedance, and ensures that when one of the third crossover lines (43) breaks, the first lead (21 and 21') remains electrically connected to the other intact third crossover lines (43), thus enhancing the touch signal level.

In some embodiments, a second lead (22 and 22') is electrically connected to at least two corresponding first crossover lines (41). This increases the width of the second lead (22 and 22'), reduces its impedance, and ensures that when one of the first crossover lines (41) breaks, the second lead (22 and 22') remains electrically connected to the other intact first crossover lines (41), thus enhancing the touch signal level.

In some embodiments, a third lead (23 and 23') is electrically connected to at least two corresponding fourth crossover lines (44). This increases the width of the third lead (23 and 23'), reduces its impedance, and ensures that when one of the fourth crossover lines (44) breaks, the third lead (23 and 23') remains electrically connected to the other intact fourth crossover lines (44), thus enhancing the touch signal level.

In some embodiments, a fourth lead (24 and 24') is electrically connected to at least two corresponding second crossover lines (42). This increases the width of the fourth lead (24 and 24'), reduces its impedance, and ensures that when one of the second crossover lines (42) breaks, the fourth lead (24 and 24') remains electrically connected to the other intact second crossover lines (42), thus enhancing the touch signal level.

In some embodiments, referring to FIG. 24A and FIG. 24B, the touch control display panel further includes a low voltage power line VSS located in the peripheral area BB. The low voltage power line VSS is generally arranged around the touch display area AA and is typically positioned in the same layer as the data signal lines in the display panel. The touch leads (2) are led out from the binding regions and are routed above the low voltage power line VSS. The low voltage power line VSS serves to separate and shield the display signals (such as data signals and scanning signals) from the touch signals in the display panel. The touch leads (2) pass through the bending regions and are directed to the upper side of the bending regions, where the binding regions are located.

In some embodiments, referring to FIG. 17 and FIG. 23, the first touch electrode Tx is a unitary structure. The second touch electrode Rx includes multiple touch sub-electrodes Rx' spaced apart by multiple connection portions LK. The touch control display panel further includes a first insulating layer 70 located between the touch sub-electrodes Rx' and the connection portions LK. The connection portions LK are positioned closer to the substrate base 1. Adjacent touch sub-electrodes Rx' are electrically connected to the connection portions LK through vias that traverse the first insulating layer 70.

In some embodiments, the touch control display panel includes a stack structure positioned between the substrate base 1 and the connection portions LK. The stack structure consists of a first source-drain metal layer SD1, a second insulating layer (not shown), and a second source-drain metal layer SD2. The first source-drain metal layer SD1 is located closer to the substrate base 1. Specifically, the first source-drain metal layer SD1, the second insulating layer, and the second source-drain metal layer SD2 are located inside the display panel 10 shown in FIG. 17.

In some embodiments, the corresponding portions of the touch wires 2 (21, 21', 22, 22', 23, 23', 24, 24') in the touch control display panel include a first metal line and a second metal line that are electrically connected. The first metal line can be positioned in the same layer as the connection portions LK, while the second metal line can be positioned in the same layer as the first touch electrode Tx. By adopting a dual-layer metal routing for the touch wires 2, the resistance of the touch wires 2 can be reduced, thereby improving signal transmission performance.

In some embodiments, the portion of the touch wires 2 (21, 21', 22, 22', 23, 23, 24, 24') corresponding to the first bending region BD1, second bending region BD2, third bending region BD3, and fourth bending region BD4 consists of the third metal line located in the second source-drain metal layer SD2. The first metal line and the third metal line are electrically connected through vias in the second insulation layer (which may include some planar layers and passivation layers) between the second source-drain metal layer and the connection portions LK. Alternatively, the second metal line and the third metal line are electrically connected through vias in the third insulation layer (which may include some planar layers and passivation layers) between the second source-drain metal layer and the first touch electrode Tx.

It should be noted that FIG. 24A to FIG. 24D and FIG. 25A to FIG. 25D in this disclosed embodiment are only intended to illustrate the wiring arrangement of the touch wires in a schematic manner. Detailed explanations of other film layers are not provided, but it is understood that the other film layers are similar to those in relevant technologies.

In another aspect, the present disclosure further provides a touch control display apparatus. In some embodiments, referring to FIG. 26, the touch control display apparatus includes the aforementioned touch control display panel provided in this disclosure and at least two flexible circuit boards located on the back of the touch control display panel. The various binding regions of the touch control display panel have multiple first solder pads, and the touch wires are electrically connected to the corresponding flexible circuit boards through the first solder pads. Since the principle of solving the problem by this touch control display apparatus is similar to that of the aforementioned touch control display panel, the implementation of this display apparatus can refer to the implementation of the aforementioned touch control display panel, and repetitive details are not repeated. This touch control display apparatus can be used in various products or components with display functionality, such as smartphones, tablets, televisions, monitors, laptops, digital photo frames, GPS devices, and so on.

Figure 26:
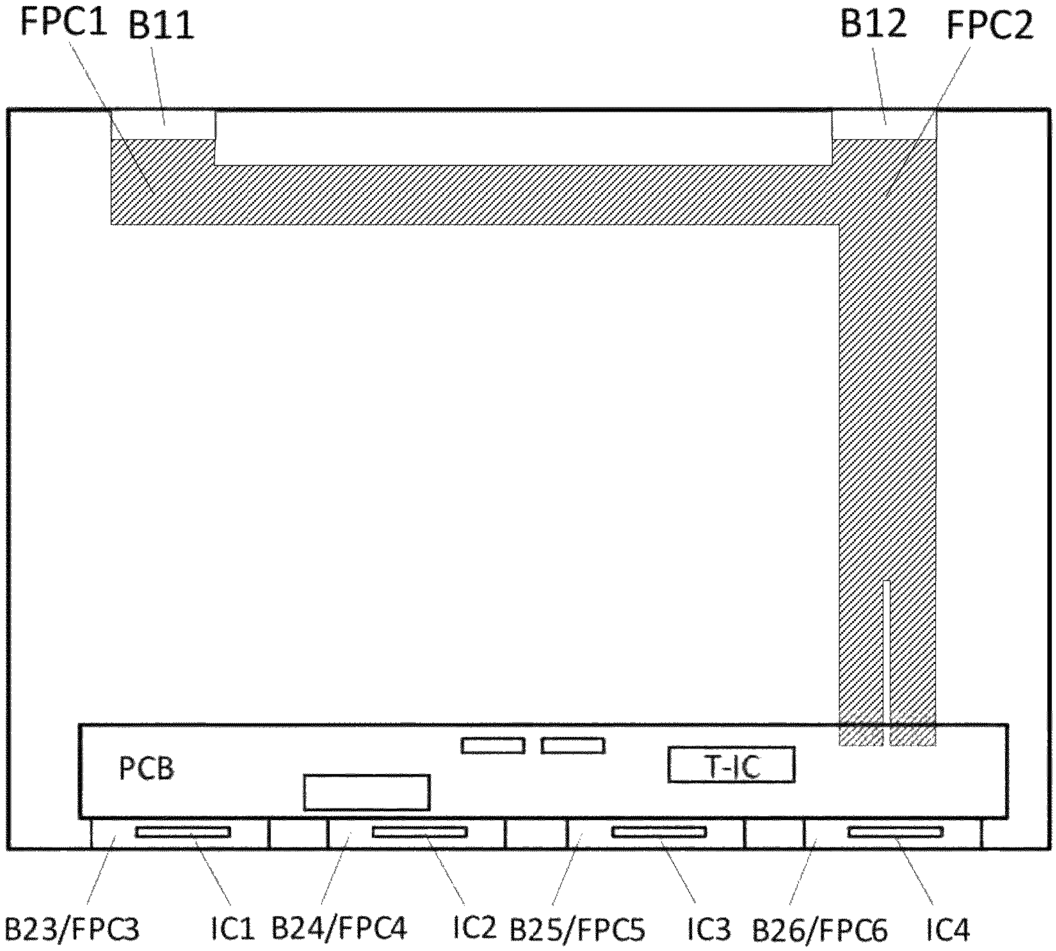
FIG. 26 is a schematic diagram of the back structure of a touch control display apparatus in some embodiments according to the present disclosure.

In some embodiments, referring to FIG. 26, which is a schematic diagram of the structure on the back of the touch control display apparatus. The touch control display panel in FIG. 26 is taken as an example of the structure shown in FIG. 20 of the aforementioned touch control display panel. In this example, the first binding region B1 includes independently set sub-binding regions B11 and B12, and the second binding region B2 includes sequentially arranged and independently set sub-binding regions B23, B24, B25, and B26 along the extension direction of the first touch electrode Tx. Furthermore, in FIG. 26, both the first binding region B1 and the second binding region B2 are bent to the back of the touch control display panel.

In some embodiments, there are at least two flexible circuit boards included in the touch control display apparatus, namely the first flexible circuit board FPC1, the second flexible circuit board FPC2, the third flexible circuit board FPC3, the fourth flexible circuit board FPC4, the fifth flexible circuit board FPC5, and the sixth flexible circuit board FPC6. The back of the touch control display panel also includes a printed circuit board (PCB), which is located near one side of the second binding region B2 and extends along the extension direction of the first touch electrode Tx.

In some embodiments, the terminals at one end of the first flexible circuit board FPC1 are connected to the first solder pad of the first sub-binding region B11. The terminals at one end of the second flexible circuit board FPC2 are connected to the first solder pad of the second sub-binding region B12. The other ends of the first flexible circuit board FPC1 and the second flexible circuit board FPC2 are electrically connected to a side of the printed circuit board (PCB) near the eighth sub-binding region B26.

In some embodiments, the terminals at one end of the third flexible circuit board FPC3 are connected to the first solder pad of the fifth sub-binding region B23. The terminals at one end of the fourth flexible circuit board FPC4 are connected to the first solder pad of the sixth sub-binding region B24. The terminals at one end of the fifth flexible circuit board FPC5 are connected to the first solder pad of the seventh sub-binding region B25. The terminals at one end of the sixth flexible circuit board FPC6 are connected to the first solder pad of the eighth sub-binding region B26.

In some embodiments, the other ends of the third flexible circuit board FPC3 are connected to the printed circuit board (PCB). The other ends of the fourth flexible circuit board FPC4 are connected to the printed circuit board (PCB). The other ends of the fifth flexible circuit board FPC5 are connected to the printed circuit board (PCB). The other ends of the sixth flexible circuit board FPC6 are connected to the printed circuit board (PCB).

In some embodiments, referring to FIG. 26, in order to prevent the flexible circuit board (FPC1 and FPC2) traces from warping during bending when routing from the first. binding region (B11 and B12) to the second binding region (B23, B24, B25, B26), branching traces are used. This means that there is a gap between the traces of FPC1 and FPC2 as they route towards the second binding region, and the traces of FPC1 and FPC2 have a serpentine-like structure and are securely connected to the underlying PCB through snap-fit connections.

In some embodiments, referring to FIG. 26, the printed circuit board (PCB) includes the first source driver chip IC1, the second source driver chip IC2, the third source driver chip IC3, and the fourth source driver chip IC4. The first source driver chip IC1 is located in the central area of the third flexible circuit board FPC3, away from the first flexible circuit board FPC1. The second source driver chip IC2 is located in the central area of the fourth flexible circuit board FPC4, away from the first flexible circuit board FPC1. The third source driver chip IC3 is located in the central area of the fifth flexible circuit board FPC5, away from the first flexible circuit board FPC1. The fourth source driver chip IC4 is located in the central area of the sixth flexible circuit board FPC6, away from the first flexible circuit board FPC1.

In some embodiments, the printed circuit board (PCB) also includes the touch driver chip T-IC located at its corner. The touch driver chip T-IC is close to the third flexible circuit board FPC3, The touch driver chip T-IC transmits the touch signals to the first flexible circuit board FPC1, second flexible circuit board FPC2, third flexible circuit board FPC3, fourth flexible circuit board FPC4, fifth flexible circuit board FPC5, and sixth flexible circuit board FPC6 through the traces on the PCB, enabling the loading of touch signals to the touch leads 2.

In some embodiments, the touch control display apparatus further includes an active pen. By configuring the routing of the touch leads to extend from the first end of the touch electrodes to the binding areas on the opposite sides of the touch control display panel, the RC loading of the touch leads is reduced. This reduction in RC loading decreases the signal attenuation of the active pen, improves the signal-to-noise ratio of the active pen, and achieves the performance requirements of the active pen. This addresses a significant issue in large-sized OLED display panels where the active pen cannot provide touch functionality, thereby enhancing the core competitiveness of large-sized OLED display products.

It should be noted that FIG. 26 in this embodiment serves as an example to illustrate the structure of the backside of the touch control display apparatus based on the configuration shown in FIG. 20. However, for the structures shown in FIGS. 19 and 21-23, the design of the backside structure of the touch control display apparatus varies depending on the specific binding areas.

In another aspect, the present disclosure further provides a touch substrate. In some embodiments, the touch substrate includes a touch display area and a non-touch display area surrounding the touch display area. The non-touch display area includes the following components: the first binding area and the second binding area located on opposite sides of the touch display area, the first bending region located between the first binding area and the touch display region, and the second bending region located between the second binding area and the touch display region.

In some embodiments, the touch substrate includes a base substrate; a touch electrode layer on the base substrate and in the touch display area, the touch electrode layer comprising multiple touch electrodes that are arranged in the same layer and insulated from each other; and multiple touch leads on the base substrate. Each touch lead is electrically connected to a corresponding touch electrode. Some of the touch leads extend from the touch display area, pass through the first bending region, and reach the first binding area, while another group of touch leads extend from the touch display area, pass through the second bending region, and reach the second binding area.

By routing a portion of the touch leads to the first binding area and another portion of the touch leads to the second binding area, the first binding area and the second binding area are positioned on opposite sides of the touch display area. In other words, the routing of the touch leads in this embodiment is from the touch electrodes to the binding areas on the relative sides of the touch control display panel. This configuration helps reduce the RC loading of the touch leads, thereby decreasing signal attenuation and improving the signal-to-noise ratio of the active pen. This enables the active pen to achieve better performance characteristics.

In some embodiments, the present touch control display apparatus further includes multiple touch electrodes, which consist of multiple horizontally and vertically intersecting first touch electrodes and second touch electrodes. The multiple touch leads comprise a first lead and a second lead. The first binding area and the second binding area are located at opposite ends of the extension direction of the second touch electrodes.

In some embodiments, each first lead is electrically connected to a corresponding first end of a first touch electrode. Some of the first leads extend from the touch display area through the first bending region to the first binding area, while the other portion of the first leads extend from the touch display area through the second bending region to the second binding area.

In some embodiments, each second lead is electrically connected to a corresponding first end of a second touch electrode. The second leads extend from the touch display area through the adjacent first bending region to the first binding area.

In some embodiments, multiple touch leads also include third leads and fourth leads. Each third lead is electrically connected to a corresponding second end of a first touch electrode. Some of the third leads extend from the touch display area through the first bending region to the first binding area, while the other portion of the third leads extend from the touch display area through the second bending region to the second binding area.

In some embodiments, each fourth lead is electrically connected to a corresponding second end of a second touch electrode. The fourth leads extend from the touch display area through the adjacent second bending region to the second binding area.

In some embodiments, the first binding area comprises independently set first sub-binding area and second sub-binding area. The first sub-binding area is located near the first end of the first touch electrode, and the second sub-binding area is located near the second end of the first touch electrode.

In some embodiments, some of the first leads extend from the touch display area through the first bending region to the side of the first sub-binding area near the first end of the first touch electrode. Some of the third leads extend from the touch display area through the first bending region to the side of the second sub-binding area near the second end of the first touch electrode.

In some embodiments, some of the second leads extend from the touch display area through the first bending region to the side of the first sub-binding area away from the first end of the first touch electrode. The other portion of the second leads extend from the touch display area through the first bending region to the side of the second sub-binding area away from the second end of the first touch electrode.

In some embodiments, the second binding area comprises independently set fifth sub-binding area, sixth sub-binding area, seventh sub-binding area, and eighth sub-binding area, which are arranged sequentially along the extension direction of the first touch electrode.

In some embodiments, another portion of the first leads extend from the touch display area through the second bending region to the side of the fifth sub-binding area near the first end of the first touch electrode. Another portion of the third leads extend from the touch display area through the second bending region to the side of the eighth sub-binding area near the second end of the first touch electrode.

In some embodiments, the fourth leads are divided along the extension direction of the first touch electrode into first group of fourth leads, second group of fourth leads, third group of fourth leads, and fourth group of fourth leads. The first group of fourth leads extend from the touch display area through the second bending region to the side of the fifth sub-binding area away from the first end of the first touch electrode. The second group of fourth leads extend from the touch display area through the second bending region to the side of the sixth sub-binding area near the first end of the first touch electrode. The third group of fourth leads extend from the touch display area through the second bending region to the side of the seventh sub-binding area near the second end of the first touch electrode. The fourth group of fourth leads extend from the touch display area through the second bending region to the side of the eighth sub-binding area away from the second end of the first touch electrode.

In another aspect, the present disclosure provides a method of operating a touch control display apparatus. In some embodiments, the touch control display apparatus includes a touch control display panel; and a display and touch control driver connected to the touch control display panel. In some embodiments, the display and touch control driver includes one or more touch integrated circuits, an oscillator, and a timing controller chip. In some embodiments, the method includes providing, by the timing controller chip, a horizontal synchronization signal and a vertical synchronization signal to the one or more touch integrated circuits; and providing, by the oscillator, a same clock signal to the one or more touch integrated circuits and the timing controller chip.

In some embodiments, the display and touch control driver includes at least a first touch integrated circuit and a second touch integrated circuit. In some embodiments, the method includes providing, by the timing controller chip, a horizontal synchronization signal and a vertical synchronization signal to the first touch integrated circuit and the second touch integrated circuit; and providing, by the oscillator, a same clock signal to the first touch integrated circuit, the second touch integrated circuit, and the timing controller chip.

In some embodiments, the display and touch control driver further includes a clock buffer. In some embodiments, the method includes receiving an input clock signal generated by the oscillator; generating, by the oscillator, multiple output clock signals that have the same frequency and phase as the input signal; and outputting the output clock signals to the timing controller chip and at least one of the one or more touch integrated circuits, respectively.

In some embodiments, the display and touch control driver includes at least a first touch integrated circuit and a second touch integrated circuit. In some embodiments, the method includes, in a first mode, performing, by the first touch integrated circuit, finger touch detection but not stylus touch detection in each frame of image; and in a second mode, performing, by the second touch integrated circuit, finger touch detection and stylus touch detection in each frame of image.

In some embodiments, the touch control display apparatus further includes a stylus. In some embodiments, the stylus includes a stylus driving chip, a wireless communication module, one or more sensors including at least one of a grip sensor and an acceleration sensor. In some embodiments, the method includes performing, by the first touch integrated circuit, finger touch detection but not stylus touch detection in each frame of image in the first mode; detecting, by the grip sensor and/or the acceleration sensor, a first state of the stylus being held by a user; transmitting, by the grip sensor and/or the acceleration sensor, a first triggering signal to a stylus driving chip and/or a wireless communication module; generating, by the stylus driving chip, downlink signals, upon receiving the first triggering signal by the stylus driving chip; transmitting, by the wireless communication module, a signal to a processor in the display and touch control driver; transmitting, by the processor, a signal to the first touch integrated circuit and a second touch integrated circuit; and upon receiving the signal from the processor, stopping operating in the first mode by the first touch integrated circuit, and starting operating in the second mode by the second touch integrated circuit.

In some embodiments, the touch control display apparatus further includes a stylus. In some embodiments, the stylus includes a stylus driving chip, a wireless communication. module, one or more sensors including at least one of a grip sensor and an acceleration sensor. In some embodiments, the method includes performing, by the second touch integrated circuit, finger touch detection and stylus touch detection in each frame of image in the second mode; detecting, by the grip sensor and/or the acceleration sensor, a second state of the stylus not being held by a user; transmitting, by the grip sensor and/or the acceleration sensor, a second triggering signal to a stylus driving chip and/or a wireless communication module; stopping generating downlink signals by the stylus driving chip, upon receiving the second triggering signal by the stylus driving chip; transmitting, by the wireless communication module, a signal to a processor in the display and touch control driver; transmitting, by the processor, a signal to the first touch integrated circuit and a second touch integrated circuit; and upon receiving the signal from the processor, stopping operating in the second mode by the second touch integrated circuit, and starting operating in the first mode by the first touch integrated circuit.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element, Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch control display apparatus, comprising a touch control display panel; a stylus having a stylus driving chip, a wireless communication module, one or more sensors including at least one of a grip sensor and an acceleration sensor; and a display and touch control driver connected to the touch control display panel;

wherein the display and touch control driver comprises one or more touch integrated circuits, an oscillator, and a timing controller chip;

the timing controller chip is configured to provide a horizontal synchronization signal and a vertical synchronization signal to the one or more touch integrated circuits; and the oscillator is configured to provide a same clock signal to the one or more touch integrated circuits and the timing controller chip;

wherein the display and touch control driver comprises at least a first touch integrated circuit and a second touch integrated circuit; and the first touch integrated circuit is configured to process touch signals generated in a first mode, and the second touch integrated circuit is configured to process touch signals generated in a second mode;

wherein the first touch integrated circuit is operated in the first mode;

the grip sensor and/or the acceleration sensor are configured to detect a first state of the stylus being held by a user;

the grip sensor and/or the acceleration sensor are configured to transmit a first triggering signal to a stylus driving chip and/or a wireless communication module;

upon receiving the first triggering signal by the stylus driving chip, the stylus driving chip is configured to generate downlink signals;

the wireless communication module is configured to transmit a signal to a processor in the display and touch control driver;

the processor is configured to transmit a signal to the first touch integrated circuit and a second touch integrated circuit; and upon receiving the signal from the processor, the first touch integrated circuit stops operating in the first mode; upon receiving the signal from the processor, the second touch integrated circuit is operated in the second mode.

2. The touch control display apparatus of claim 1, wherein a load capacity of the oscillator is greater than a sum of a first total load and a second total load;

the first total load includes a first internal load associated with the one or more touch integrated circuits and a load on a signal line connecting the oscillator and the one or more touch integrated circuits; and the second total load includes a second internal load associated with the timing controller chip and a load on a signal line connecting the oscillator and the timing controller chip.

3. The touch control display apparatus of claim 1, wherein the display and touch control driver comprises a single touch integrated circuit.

4. The touch control display apparatus of claim 1, wherein the display and touch control driver comprises at least a first touch integrated circuit and a second touch integrated circuit;

the timing controller chip is configured to provide a horizontal synchronization signal and a vertical synchronization signal to the first touch integrated circuit and the second touch integrated circuit; and the oscillator is configured to provide a same clock signal to the first touch integrated circuit, the second touch integrated circuit, and the timing controller chip.

5. The touch control display apparatus of claim 1, wherein the display and touch control driver further comprises a clock buffer configured to receive an input clock signal generated by the oscillator, generate multiple output clock signals that have the same frequency and phase as the input signal, and output the output clock signals to the timing controller chip and at least one of the one or more touch integrated circuits, respectively.

6. The touch control display apparatus of claim 5, wherein the display and touch control driver comprises at least a first touch integrated circuit and a second touch integrated circuit; and the clock buffer is configured to output a first output clock signal to the timing controller chip, output a second output clock signal to the first touch integrated circuit, and output a third output clock signal to the second touch integrated circuit.

7. The touch control display apparatus of claim 5, wherein the display and touch control driver comprises at least a first touch integrated circuit and a second touch integrated circuit;

the clock buffer is configured to output a first output clock signal to the timing controller chip, and output a second output clock signal to the first touch integrated circuit; and the clock buffer does not directly output a clock signal to the second touch integrated circuit.

8. The touch control display apparatus of claim 7, wherein the first touch integrated circuit and the second touch integrated circuit are cascaded;

the first touch integrated circuit and the second touch integrated circuit are further configured to transmit a clock synchronization signal between each other; and the clock synchronization signal is configured for clock signal synchronization between the first touch integrated circuit and the second touch integrated circuit.

9. The touch control display apparatus of claim 1, wherein, in the first mode, the first touch integrated circuit is configured to perform finger touch detection but not stylus touch detection in each frame of image.

10. The touch control display apparatus of claim 1, wherein, in the second mode, the second touch integrated circuit is configured to perform finger touch detection and stylus touch detection in each frame of image.

11. A touch control display apparatus, comprising a touch control display panel; a stylus having a stylus driving chip, a wireless communication module, one or more sensors including at least one of a grip sensor and an acceleration sensor; and a display and touch control driver connected to the touch control display panel;

wherein the display and touch control driver comprises one or more touch integrated circuits, an oscillator, and a timing controller chip;

the timing controller chip is configured to provide a horizontal synchronization signal and a vertical synchronization signal to the one or more touch integrated circuits; and the oscillator is configured to provide a same clock signal to the one or more touch integrated circuits and the timing controller chip;

wherein the display and touch control driver comprises at least a first touch integrated circuit and a second touch integrated circuit; and the first touch integrated circuit is configured to process touch signals generated in a first mode, and the second touch integrated circuit is configured to process touch signals generated in a second mode;

wherein the second touch integrated circuit is operated in the second mode;

the grip sensor and/or the acceleration sensor are configured to detect a second state of the stylus not being held by a user;

the grip sensor and/or the acceleration sensor are configured to transmit a second triggering signal to a stylus driving chip and/or a wireless communication module;

upon receiving the second triggering signal by the stylus driving chip, the stylus driving chip is configured to stop generating downlink signals;

the wireless communication module is configured to transmit a signal to a processor in the display and touch control driver;

the processor is configured to transmit a signal to the first touch integrated circuit and a second touch integrated circuit;

upon receiving the signal from the processor, the first touch integrated circuit is operated in the first mode; and upon receiving the signal from the processor, the second touch integrated circuit stops operating in the second mode.

12. A method of operating a touch control display apparatus, wherein the touch control display apparatus includes a touch control display panel; and a display and touch control driver connected to the touch control display panel;

wherein the display and touch control driver comprises one or more touch integrated circuits, an oscillator, and a timing controller chip;

wherein the method comprises:

providing, by the timing controller chip, a horizontal synchronization signal and a vertical synchronization signal to the one or more touch integrated circuits; and providing, by the oscillator, a same clock signal to the one or more touch integrated circuits and the timing controller chip;

wherein the display and touch control driver comprises at least a first touch integrated circuit and a second touch integrated circuit;

wherein the method further comprises:

in a first mode, performing, by the first touch integrated circuit, finger touch detection but not stylus touch detection in each frame of image; and in a second mode, performing, by the second touch integrated circuit, finger touch detection and stylus touch detection in each frame of image;

wherein the touch control display apparatus further includes a stylus;

the stylus comprises a stylus driving chip, a wireless communication module, one or more sensors including at least one of a grip sensor and an acceleration sensor;

wherein the method further comprises:

performing, by the first touch integrated circuit, finger touch detection but not stylus touch detection in each frame of image in the first mode;

detecting, by the grip sensor and/or the acceleration sensor, a first state of the stylus being held by a user;

transmitting, by the grip sensor and/or the acceleration sensor, a first triggering signal to a stylus driving chip and/or a wireless communication module;

generating, by the stylus driving chip, downlink signals, upon receiving the first triggering signal by the stylus driving chip;

transmitting, by the wireless communication module, a signal to a processor in the display and touch control driver;

transmitting, by the processor, a signal to the first touch integrated circuit and a second touch integrated circuit; and upon receiving the signal from the processor, stopping operating in the first mode by the first touch integrated circuit, and starting operating in the second mode by the second touch integrated circuit.

13. The method of claim 12, wherein the display and touch control driver comprises at least a first touch integrated circuit and a second touch integrated circuit;

wherein the method comprises:

providing, by the timing controller chip, a horizontal synchronization signal and a vertical synchronization signal to the first touch integrated circuit and the second touch integrated circuit; and providing, by the oscillator, a same clock signal to the first touch integrated circuit, the second touch integrated circuit, and the timing controller chip.

14. The method of claim 12, wherein the display and touch control driver further comprises a clock buffer;

wherein the method further comprises:

receiving an input clock signal generated by the oscillator;

generating, by the clock buffer, multiple output clock signals that have the same frequency and phase as the input signal; and outputting the output clock signals to the timing controller chip and at least one of the one or more touch integrated circuits, respectively.

* * * * *